United States Patent [19]

Ishida et al.

[11] Patent Number: 4,737,813

[45] Date of Patent: Apr. 12, 1988

[54] AUTOMATIC FOCUS CONTROL DEVICE FOR USE IN A CAMERA SYSTEM

[75] Inventors: Tokuji Ishida, Daito; Masataka Hamada, Osaka; Kenji Ishibashi, Sakai, all of Japan

[73] Assignee: Minolta Camera Kabushiki Kaisha, Osaka, Japan

[21] Appl. No.: 82,095

[22] Filed: Aug. 5, 1987

[30] Foreign Application Priority Data

Aug. 6, 1986 [JP] Japan ................................. 61-185942

[51] Int. Cl.$^4$ ............................................. G03B 3/00
[52] U.S. Cl. .................................. 354/403; 354/406; 354/402
[58] Field of Search ............... 354/400, 402, 403, 406, 354/407, 195.1

[56] References Cited

U.S. PATENT DOCUMENTS 4,592,638  6/1986  Kaneda et al. ...................... 354/403
4,602,861  7/1986  Taniguchi et al. .................. 354/403
4,618,235  10/1986  Ishida et al. ........................ 354/403

Primary Examiner—Russell E. Adams
Attorney, Agent, or Firm—Burns, Doane, Swecker & Mathis

[57] ABSTRACT

In an automatic focus detection device for use in a camera, a focus condition detecting unit detects a focus condition of a photographic lens in a camera based on the output of a light receiving device and calculates the amount of defocus of the photographic lens. An auxiliary light emitting device emits auxiliary light and comparator compares the stored output of memory and the output of the light receiving device under the ambient light; and then the detected defocus amount under the auxiliary light emission is corrected in accordance with the result of comparison so as to eliminate the bad effect of the color aberration of the lens of the camera, whereby a correct focus position can be detected.

11 Claims, 22 Drawing Sheets

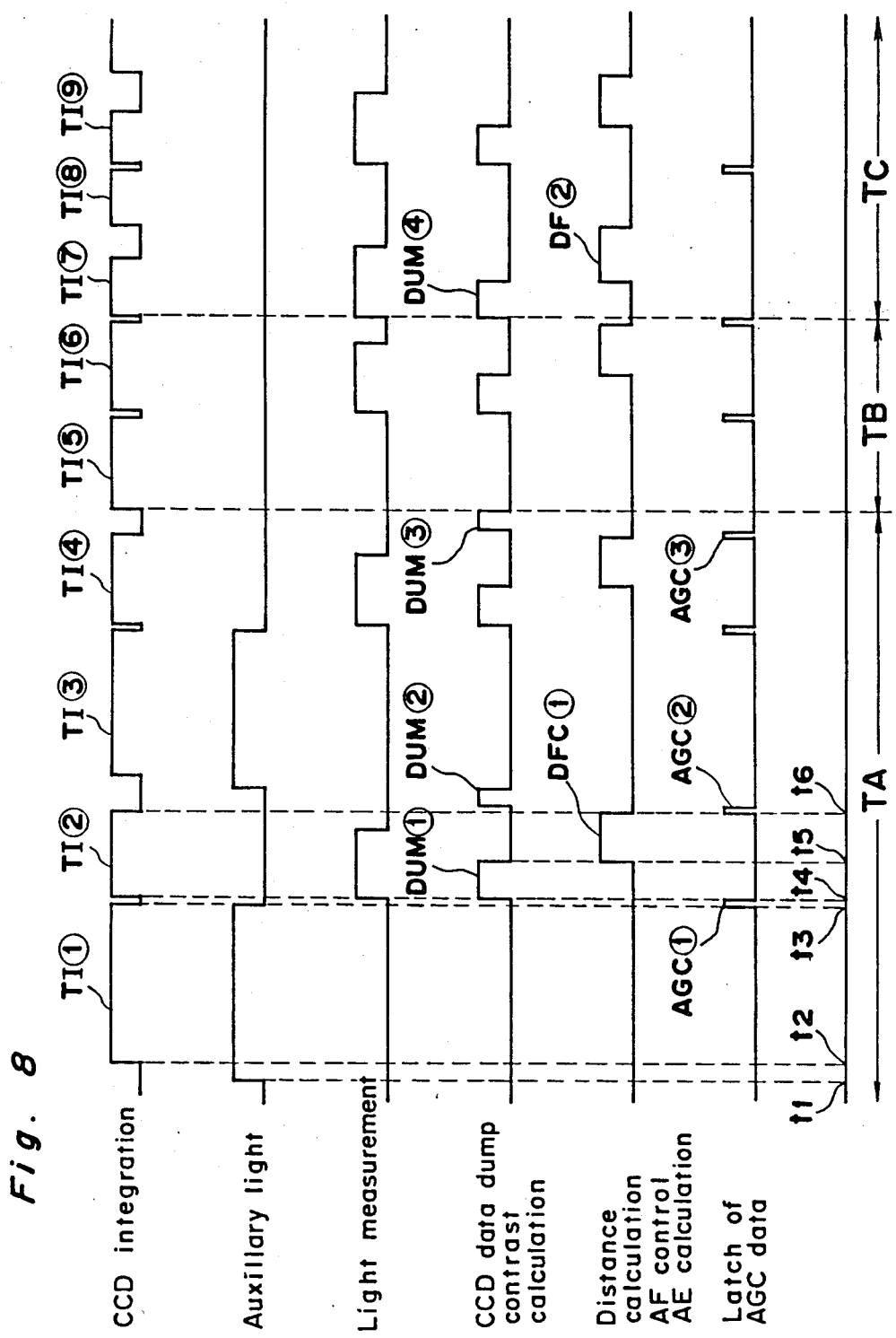

AUTOMATIC FOCUS CONTROL DEVICE FOR USE IN A CAMERA SYSTEM

BACKGROUND OF THE INVENTION

1. Field of the Invention

The present invention relates to an automatic focus control device for use in a camera system, more particularly, to an automatic focus control device having an auxiliary light source for radiating auxiliary light to an object in case of low brightness and/or low contrast of the object.

2. Description of Prior Art

There is provided a camera system comprising an automatic focus control device which detects a focus condition such as the amount of defocus and the direction of defocus in accordance with a light passing through a photograph lens of the camera from an object to be focus controlled, and controls an automatic focus adjustment in accordance with a result of the focus condition detection. In this sort of automatic focus control device, it is possible to detect an in-focus position correctly, when the amount of defocus or a defocus value, corresponding to a difference quantity between a current position and an infocus position of a photograph lens of the camera, is only within an available range of the focus detection. On the other hand, it is impossible to detect the in-focus position when the defocus value is out of the detection available range, in this case, a low contrast search control is performed as follows. That is, the focus condition is detected moving the photograph lens into another position, and the in-focus position of the object is detected when the photograph lens is positioned in the detection available range.

Conventionally, there are known focus detecting device in which an auxiliary light is radiated to an object to be focus detected from an auxiliary light source so as to detect the correct focus condition under the low brightness of the object.

Besides, a photographic lens has a color aberration which is a displacement of the focus position due to wave length of light. In case the focus detection is made using an infra red or a red auxiliary light there occurs a difference of the focus position due to the color aberration between a focus position with the light wave length of the auxiliary light for the focus detection and a focus position with a reference wave length of the ambient light for the photographing.

To compensate the difference of the focus detection, Japanese laid open patent No. 43620/1985 proposes a focus detecting device which enables to obtain a correct focus position by using a property that the aberration on a lens axis changes linearly within a wave length range including infra red light. In the proposed arrangement, one or more data of the color aberrations on the lens axis in a specific wave length is stored in a register of the focus detecting device, then the color aberration of the wave length of the light used for the focus detection is obtained based on the stored color abberation data, the specific wave length, the wave length of the light at the time of focus detection and the reference wave length. Thus a focus position obtained by the measurement using the auxiliary light is subtracted by the obtained color aberration so that a correct focus position can be obtained.

However, in the above method, there must be provided optical filters on the respective optical systems of either the auxiliary light emitting side and light receiving side. Furthermore, there must be provided an arrangement of switching light filters in the light receiving optical system corresponding in accordance with the focus detection under ambient light and under auxiliary light. Hence, the device becomes complicated and expensive.

There is disclosed in Japanese Laid Open Patent publication No. 59413/1983 another focus detection device in which the difference of the focus positions between the ambient light and the infra red light by a calculation $\Delta d \times$ (color aberration of the infra red light)/(color aberration of the ambient light) so that a correct automatic focus can be obtained under any light having any wave length. $\Delta d$ represents the difference of the focus position between the ambient light of a specific wave length and infra red light.

In the arrangement, there must be provided another set of light receiving element and its connecting terminals for deriving the signal from the light receiving element in addition to the light receiving element for detecting the contrast of the object, whereby the arrangement is not suitable to decrease the size of the arrangement and production cost. Moreover, there occurs an excessive correction for an output of the photosensor array of the automatic focus control in case of the object with a high contrast and low output for the ambient light and a low contrast and high output for the infra red light.

SUMMARY OF THE INVENTION

An essential object of the present invention is to overcome the aforementioned problems and to provide an automatic focus control device using an auxiliary light source which is able to detect the focal condition correctly with a high accuracy and low cost.

According to the present invention, there is provided an automatic focus control device comprising;

a focus detecting means for detecting focus condition of a photographic lens and calculating an amount of defocus by output of light receiving means which receives light passing through the photographic lens;

an auxiliary light emitting means for emitting auxiliary light;

comparing means for comparing the output of the light receiving means under only the ambient light and the output of the light receiving means under the auxiliary light emission and ambient light; and means for correcting the detected defocus amount under the auxiliary light emission in accordance with the result of the comparison.

According to the present invention, since the displacement of the focal position of the photographic lens is corrected by the color aberration of the photographic lens, in case the focal detection is performed using an auxiliary light which is added to the ambient light, the correct focal value can be obtained.

Moreover, there is no need to change filters mounted to the respective optical system therefore, operation of the automatic focus control device becomes simple and the manufacturing cost may be decreased since the arrangement for changing the filter is unnecessary.

BRIEF DESCRIPTION OF THE DRAWINGS

FIG. 8 is a timing chart showing timings of a CCD integration of the control circuit shown in FIGS. 2A and 2B, FIGS. 9A to 9C are graphs showing a distance measurement range during the automatic focus operation.

DETAILED DESCRIPTION OF THE PREFERRED EMBODIMENTS

Principle of automatic focus control

Figure 10:
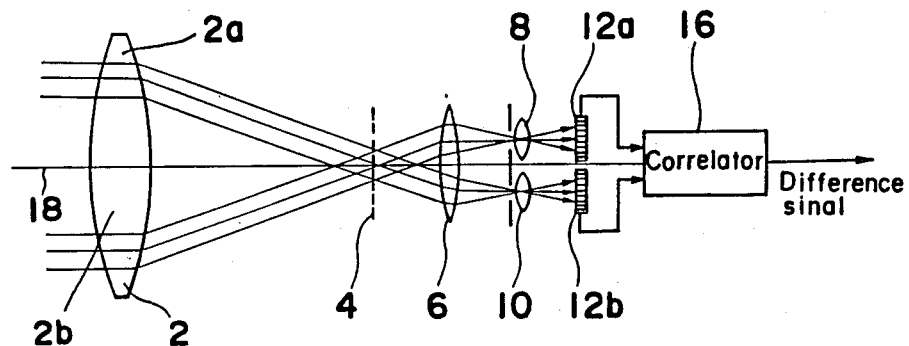
FIGS. 10 and 11 are schematic diagrams showing a principle of focus condition detection.
Figure 11:
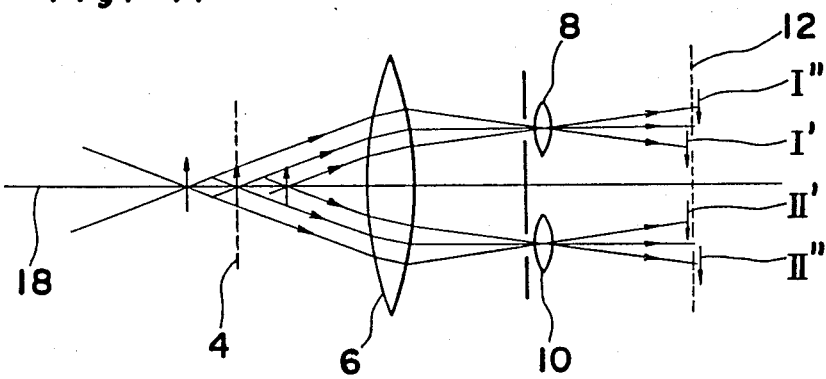

First of all, the principle of the automatic focus control will be described below in details. "Automatic focus" is referred to hereinafter as AF. FIGS. 10 and 11 show an optical system of a focus condition detecting device for the automatic focus control. In FIG. 10, pencils of light rays of the object passing through the first and the second portions 2a and 2b of a photograph lens 2 symmetrical with respect to the optical axis 18 are reimaged to form two images. By determining the correlation between the two images, the amount of defocus and the direction of defocus from an expected focal point are measured.

A condenser lens 6 positioned behind the photograph lens 2 is arranged at the expected focal point plane 4, or behind the expected focal point plane 4. Image reformation lenses 8 and 10 positioned behind the condenser lens 4 are positioned symmetrically to the optical axis 18 of the photograph lens 2. A linear image sensors 12a and 12b such as charge coupled device (referred to hereinafter as CCD) are arranged respectively at the image formation plane of the image reformation lens 8 and 10.

In FIG. 11, a piece of the image sensor 12 is used as the aforementioned two image sensors 12a and 12b for the convenience of explanation.

When the image of the object is formed at the expected focal point plane 4 (referred to hereinafter as infocus condition), the distance between the two images formed on the image sensor 12 becomes a distance predetermined by the optical system for the focus condition detection. When the image of the object is formed at the forward position from the expected focal point surface 4 (referred to hereinafter as forward focus condition), the images I' and II' formed on the image sensor 12 are near the optical axis 18, resulting in that the distance between the images I' and II' is smaller than the aforementioned distance of the expected in-focus condition. On the other hand, when the image of the object is formed behind the expected focal point surface 4 (referred to hereinafter as backward focus condition), the images I'' and II'' formed on the image sensor 12 are far from the optical axis 18, resulting in that the distance between the images I'' and II'' is larger than the aforementioned distance of the expected in-focus condition. Therefore, the focus condition of the object can be judged by detecting the distance between the images I and II formed on the image sensor 12.

The calculation of the distance required for moving the lens to the position of the expected focal point, i.e., the defocus value DF will be described below in details.

Figure 12:
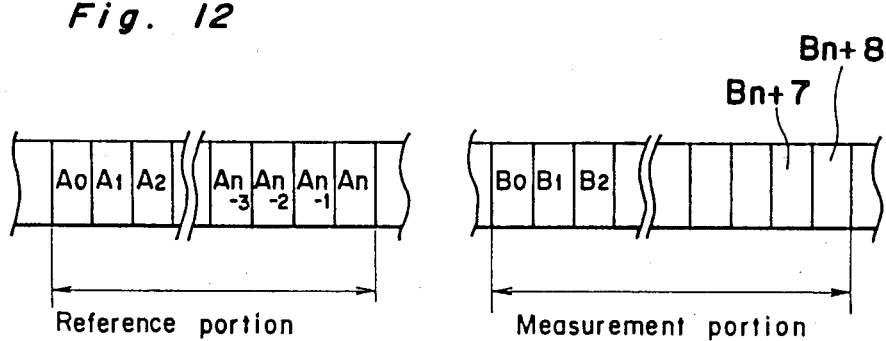
FIG. 12 is a schematic diagram showing a reference portion and a measurement portion of a CCD image sensor FLM shown in FIG. 2A.

FIG. 12 shows pixel of the image sensor 12. In FIG. 12, the image I is formed on pixel A0 to An of a reference portion of the image sensor 12 by the image reformation lens 8, and the pixel A0 to An of the image sensor 12 output pix signals Ia0 to Ian respectively. On the other hand, the image II is formed on pixel B0 to Bn+8 of a measurement portion of the image sensor 12 by the image reformation lens 10, and the pixel B0 to Bn+8 of the image sensor 12 output pix signals Ib0 to Ibn+8 respectively. It is detected, which portion of the image I formed on the reference portion of the image sensor 12 mostly corresponds to or coincides with a portion of the image II formed on the measurement portion of the image sensor 12. By detecting the distance between the detected portion of the image I and the corresponding portion of the image II, the defocus value can be calculated from the distance between the images I and II. The calculation of the defocus value will be described below in details.

Each of the pix signal of 9 pairs of the pix signals (Ib0 to Ibn), (Ib1 to Ibn+1), ---, (Ibn to Ibn+8) outputted from 9 pairs of the pixel (B0 to Bn), (B1 to Bn+1), ---, (Bn to Bn+8) of the measurement portion of the image sensor 12 is respectively compared in order with each of a pair of the pix signals (Ia0 to Ian) outputted from the pixel (A0 to An) of the reference portion of the image sensor 12, and it is detected which pair of the pix signals of the measurement portion of the image sensor 12 mostly corresponds to a pair of the pix signals (Ia0 to Ian) of the reference portion of the image sensor 12. The detection can be performed, for example, by the following procedure.

For 9 combinations (j=0 to 8) corresponding to 9 pairs of pix signals (Ib0 to Ibn), (Ib1 to Ibn+1), ---, (Ibn to Ibn+8) outputted from 9 pairs of the pixel (B0 to Bn), (B1 to Bn+1), ---, (Bn to Bn+8) of the measurement portion of the image sensor 12, the following values Fj are calculated.

$$Fj = \sum_{i=0}^{n} |Ibi - j - Iai|$$

Next, the minimum value Fjmin of 9 values Fj is obtained, and a pair of the pixel of the measurement portion of the image sensor 12 corresponding to Fjmin is obtained, resulting in that the pix signals outputted from the obtained pair of the pixel of the measurement portion of the image sensor 12 mostly corresponds to the pix signals outputted from the pixel of the reference portion of the image sensor 12.

For example, if the pix signals Ib4 to Ibn+4 mostly corresponds to the pix signals Ia0 to Ian respectively, the distance between a pair of the pixel (B4 to Bn+4) and the pixel A0 to An can be calculated as the distance between the images I and II formed on the image sensor 12. If the pix A0 is a th pix of the image sensor 12 and the pix B0 is b th pix of the image sensor 12, the number of the pixel is (b+4−a). Therefore, the distance between the images I and II is calculated by the following equation.

$$lx = (b+4-a) \times d \quad (1)$$

where d is a pitch between the pixel of the image sensor 12.

If the distance between the images I and II is l0 in design on the in-focus condition, the defocus value DF is calculated by the following equation.

$$DF = K \times \{(b+4-a) \times d - l0\} \quad (2)$$

where K is a constant of the optical system of the focus condition detecting device.

The above defocus value DF includes the information of the direction of defocus. DF=0 represents the in-focus condition, the positive value DF represents the backward focus condition, and the negative value DF represents the forward focus condition. The available range of the defocus value DF which can be detected by the above calculation is as follows.

$$K \times \{(b-a) \times d - l0\} \leq DF \leq K \times \{(b+8-a) \times d - l0\} \quad (3)$$

The defocus value DF can be calculated in the above range (3) in the distance measurement, and the range (3) is referred to hereinafter as defocus cover range.

The method for calculating the distance between the images I and II more correctly by detecting the corresponding relationship between the images I and II formed on the image sensor 12 is disclosed in details in the Japanese patent laid open Nos. 126517/1984 and 4914/1985 by the applicant of the present invention. The method is not described in this specification because the subject matter of the present invention is not pertinent thereto.

A contrast value C, a correlation level value YM, and a peak value P of the pix signal used for the judgment of a reliability of the defocus value DF and the judgment of lighting or emission of an auxiliary light will be described below in details.

The peak value P of the pix signal is defined by the following equation as the maximum value of the pix signals Ia0 to Ian outputted from the pixel of the reference portion of the image sensor 12 used for calculating the above defocus value DF.

$$P = max\{Ia0, Ia1, ---, Ian\} \quad (4)$$

The contrast value C is defined by the following equation.

$$C = \sum_{k=0}^{n-1} |Iak - Iak + 1| \quad (5)$$

The correlation level value YM is defined by the following equation.

$$YM = Hmin/C \quad (6)$$

where
$$Hmin = min \{H(1), H(2), ---, H(9)\} \quad (7)$$

and H(l) is defined as a correspondence function by the following equation.

$$H(l) = \sum_{k=0}^{n} |Iak - Iak + l - 1|, \quad (8)$$
$$l = 1, 2, ---, 9$$

The correlation level value YM is a normalized function by the contrast value C, because the correspondence function H(l) is depend on the contrast value C. The correlation level value YM can be obtained as the unit of the pitch between the pixel of the image sensor 12, however, in practical, the correspondence function often becomes a minimum value at the middle position between the pixel. Therefore, the interpolation calculation can be performed in order to obtain a position lmin where the minimum value Hmin of the correspondence function H(l) really becomes a minimum value. Moreover, the correlation level value YM can be more correctly obtained by using the above real minimum value l min. The above interpolation calculation method is described in the Japanese patent laid open No. 126517/1984 by the applicant of the present invention, and the method is not described in this specification, because the method is not the subject matter of the present invention.

It is referred to hereinafter as low contrast condition, when the peak value P of the pixel is smaller than a predetermined threshold value or the object is dark, when the contract value C is smaller than a predetermined threshold value or the object is in a low contrast, or when the correlation level value YM is larger than a predetermined threshold value. In the case of the low contrast, the reliability of the defocus value DF is reduced.

A way of correction to the error of the focus position due to the color aberration of the photographic lens in case of focus detection when the auxiliary light is radiated to the object will be described below in details.

Figure 13:
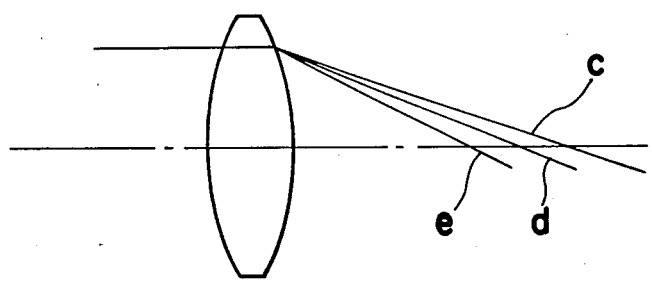
FIG. 13 is a schematic diagram showing a color aberration due to the difference of the wave length.

As well known, the focal position of the light passed the photographic lens differs corresponding to the wave length of the light. For example, as shown in FIG. 13, the focal position of a standard light (shown by d) having 587 nm wave length, for example, focuses at a position nearer to the photographic lens than the light c existing at the infra red region. In a similar manner the focal position of the light (shown by e) having a shorter wave length than that of the light d is situated nearer to the photographic lens than the light d.

Figure 14:
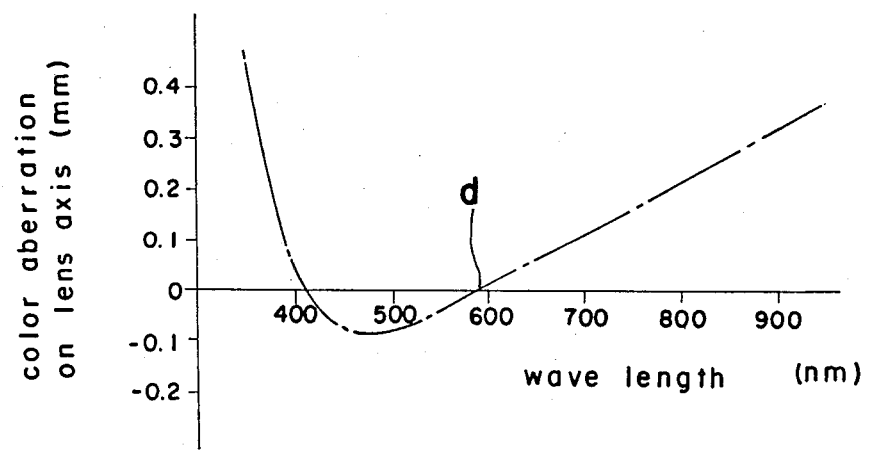
FIGS. 14 and 15 are respectively schematic diagrams showing amounts of the color aberration on a lens axis for various wave lengths.

FIG. 14 shows a manner of change of the color aberration on the lens axis of the lens made of abnormal dispersion glass or fluorite.

FIG. 14 shows how long the focal positions of various lights are displaced from the focal position of the light d (587 nm) when the latter is focused. Apparent from FIG. 14, the color aberration is linearly increased in the range of the wave length longer than 500 nm. Such property can be seen in case of any conventional lenses. However, the amount of color aberration on the axis is different for the various lenses. The gradient of the linear part of the property of the color aberration on the axis is also different for each lens.

Figure 15:
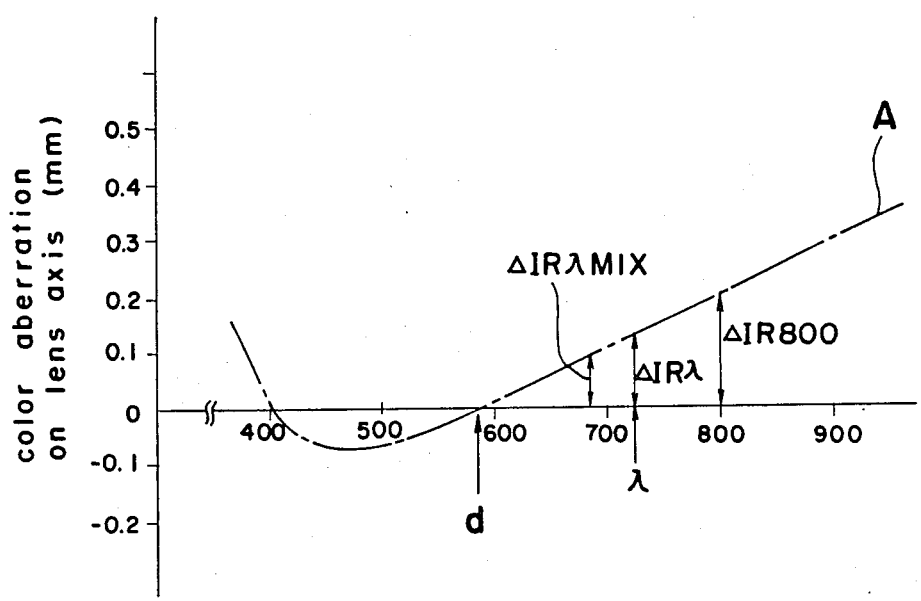

In case of a photographic lens having a property of color aberration on the lens axis as shown in line A in FIG. 15, with the light d (587 nm) focused, when the focus detection is made with the auxiliary light having the wave length λ, there occurs difference ΔIR λ of the focal position. The value of ΔIR λ can be obtained by an equation $$\Delta IR\lambda = \Delta IR_{800} X(\lambda - \lambda d)/(800 - \lambda d) \quad (9)$$

assuming that the color aberration $\Delta IR_{800}$ on the axis of the light of wave length of 800 nm is known.

λd is the wave length of 587 nm.

Figure 16:
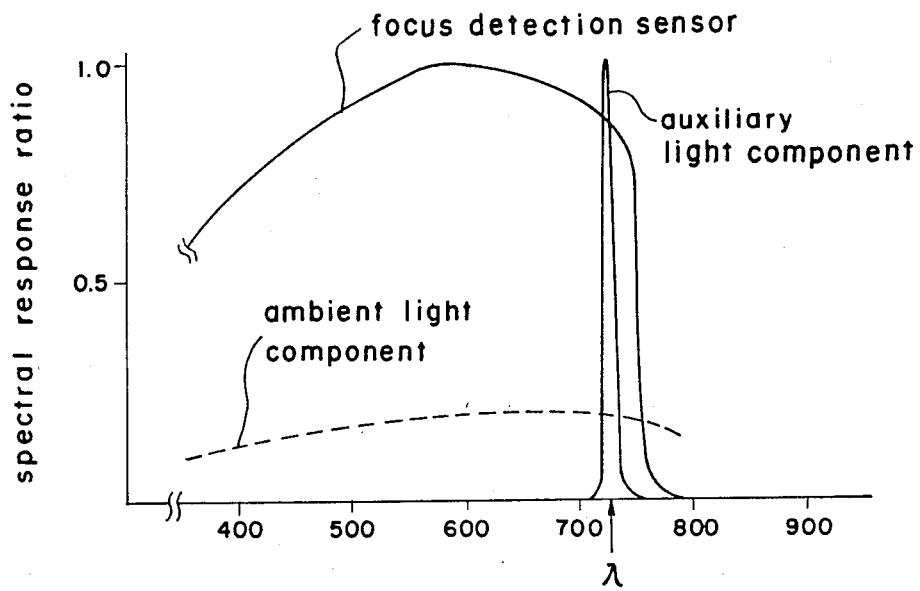
FIG. 16 is a graph showing spectral response ratio in the focus detecting system.

The spectral response ratio of the focal detection system is required a wide range as shown in FIG. 16 so that the detection system is operable against the ambient light and auxiliary light. Therefore, in case the focal detection is made in a complete dark where the ambient light component is zero, the correction by the equation (9) can be made correctly. However, in case there is any ambient light, the focal detection is made by the light which is the mixture of the auxiliary light and ambient light, so that there occurs an error. As shown in FIG. 16, both of the auxiliary light component and ambient light component are detected in the spectral response of the focal detecting system. In FIG. 16, an example of ambient light component is shown by the dotted lines. Thus there occurs an error ΔIR λmix which is displaced from ΔIR λby ΔIR λ−ΔIR λmix. In order to correct the error, there may be proposed to correct the error using a ratio of the intensity of the ambient light and the intensity of auxiliary light contained in the mixed light. The focal detection depends on the amount of change of the light intensity of the object i.e., the contrast of the object, but is not affected by the intensity of the light. Therefore, in case the light intensity of the object is proportional to the contrast of the object, it is possible to correct the error using the method mentioned above. However, in case the contrast is not proportional to the light intensity of the object, there occurs an error in the focal detection. Namely, in case the spectral response ratio is different for the wave length of the auxiliary light and for the wave length of the ambient light or contrast pattern is used as the auxiliary light, there occurs an error. In such a case, a correction can be made by obtaining the contrast of the ambient light component in the mixed light and the contrast of the auxiliary light component in the mixed light. For example, assuming the contrast of the object Cd 1 under the ambient light without the auxiliary light and the contrast of the object Cmix under the mixed light with the auxiliary light, in case of dark, Cd 1=0 and Cd 1/Cmix=0. In this case, the displacement of the focal position from the focal position for the standard light can be calculated by equation (9) with the result of ΔIR λ.

In case of the auxiliary light component is zero even if the auxiliary light is radiated to the object which may occur the object is situated at the infinite point, Cd 1=Cmin or Cd 1/Cmin=1 is obtained. Thus the focal position for the auxiliary light is equivalent to the focal position for the standard light and the error is zero.

By approximating the change of the value ΔIR λis linear in the range between Cd 1/Cmix=0 to Cd 1=1, $$\Delta IR\ \lambda mix = \Delta IR\ \lambda X(1 - Cd\ 1/Cmix) \quad (10)$$

can be obtained. Thus an accurate focal position can be obtained by correcting the detected focal position by the result of the equation (9).

Construction of automatic focus camera

An automatic focus camera of a preferred embodiment according to the present invention will be described below in details.

Figure 1:
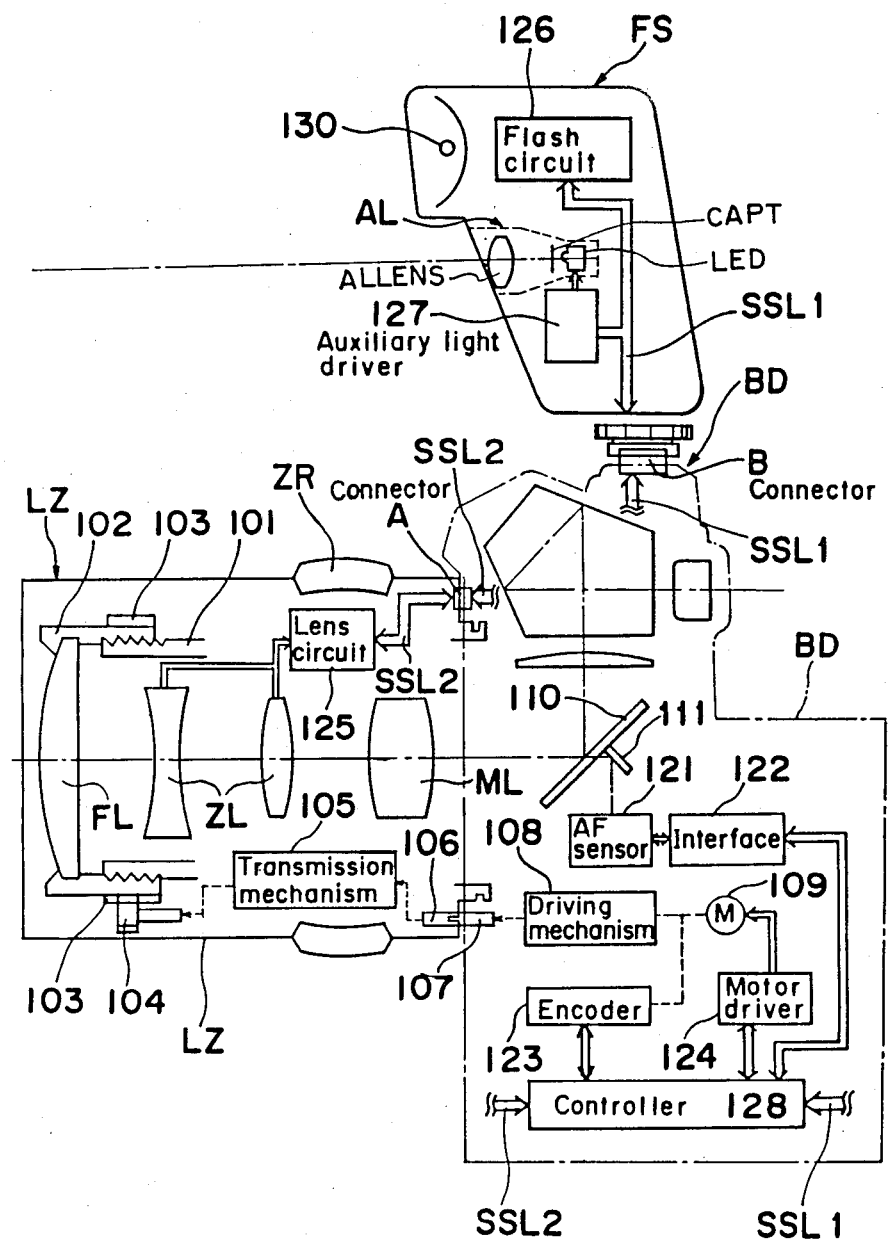
FIG. 1 is a schematic diagram of an automatic focus camera of a preferred embodiment according to the present invention.

FIG. 1 shows the whole construction of the automatic focus camera. In FIG. 1, the portion surrounded by a chain line is a main body BD of the camera. At the left side of the main body BD of the camera, a zoom lens LZ which is one example of various kinds of interchangeable lenses is detachably mounted on the main body BD. An electric flash device FS enclosing an auxiliary light device AL is detachably mounted on the top surface of the main body BD.

The zoom lens LZ is mechanically connected to the main body BD by clutch members 106 and 107, and a lens circuit 125 in the zoom lens LZ is connected to an AF controller 128 of the main body BD via a connector A and a signal bus SSL2. A flash driver 126 and an auxiliary light driver 127 of the electric flash device FS are connected to the controller 128 via a connector B and a signal bus SSL1.

The light beam reflected from the object passes through a lens group FL for focus adjustment, a lens group ZL for zooming, and a master lens group ML of the zoom lens LZ. Then, one portion of the light beam is reflected on a main mirror 110 and goes to a finder portion, on the other hand, one portion of the light beam passes through a half mirror portion positioned in the center portion of the main mirror 110, and goes to an automatic focus sensor module 121 (referred to hereinafter as AF sensor module) via a submirror portion 111.

The AF sensor module 121 is connected to the AF controller 128 via an interface circuit 122, and the lens circuit 125 is connected to the AF controller 128 via the connector A and the signal bus SSL2, as described above. The AF controller 128 calculates the aforementioned defocus value DF from the information inputted from the AF sensor module 121. The AF controller 128 also converts, by receiving the lens information fed from the lens circuit 125 and the focal length value set by the manual rotation of a zoom ring ZR driven by a user of the camera, the calculated defocus value DF to the number of rotations of a motor 109 required for driving the lens group FL for focus adjustment for moving the lens group FL to the in-focus position.

Moreover, the transmission mechanism for focus adjustment will be described below in details. The AF controller 128 is connected to a motor driver 124 for driving the motor 109 and an encoder 123 for detecting the speed and the number of rotations of the motor 109, and the motor 109 is driven by the motor driver 124 so that the motor 109 rotates by the number of rotations calculated by the AF controller 128. The rotation force of the motor 109 is transmitted to a big gearwheel 103 arranged at the outer portion of a focus adjustment member 102 of the lens group FL for focus adjustment via a driving mechanism 108 of the main body BD of the camera, the clutch members 106 and 107, a transmission mechanism 105, and a little gearwheel 104 in the zoom lens LZ. A female helicoid screw is formed at the inner portion of the focus adjustment member 102, on the other hand, a male helicoid screw for engaging with the female helicoid screw is formed at the fixed portion 101 which is formed as one body with the lens mount of the zoom lens LZ. The lens FL for focus adjustment is moved forward and backward by the mechanical power transmitted to the big gearwheel 103, resulting in that the focus adjustment is performed.

As described above, the flash driver 126 and the auxiliary light driver 127 are connected to the AF controller 128 via the connector B and the signal bus SSL1. Turning on and off of lighting of a flash tube 130 and the auxiliary light device AL is controlled by the AF controller 128.

An auxiliary light emitting device AL comprises a light source using light emitting diode LED and a contrast pattern CPAT is radiated through a radiation lens ALLENS. The wave length of the LED is 700 nm considering the spectral light permeability of the zoom lens LZ, spectral response of the AF sensor module 121 and uncomfortableness of a person as an object to be photographed when the auxiliary light is radiated thereto.

Figure 2A:
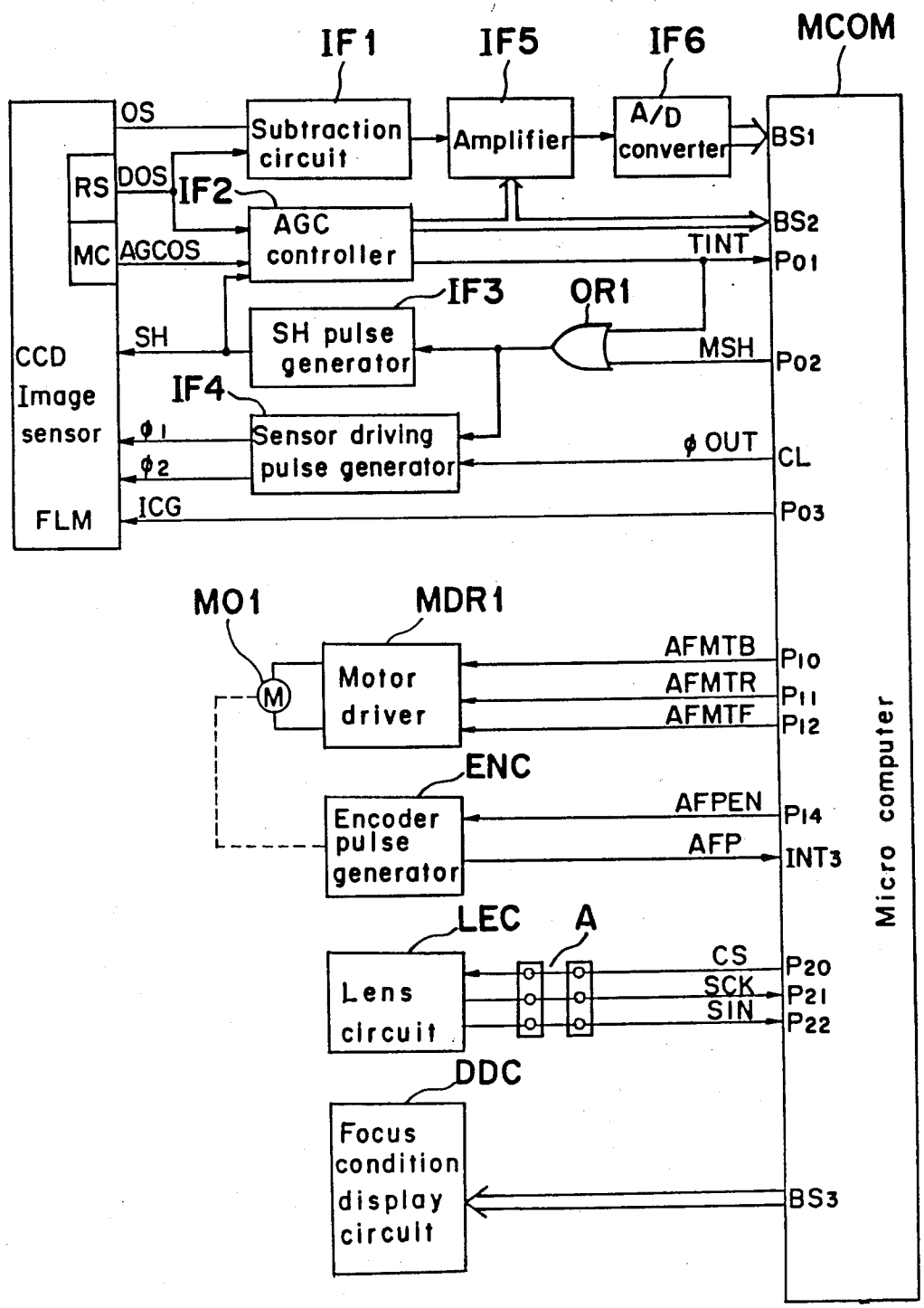
FIGS. 2A and 2B are schematic diagrams of a control circuit of the automatic focus camera shown in FIG. 1, FIGS. 3A to 3F are flow charts showing a control operation of the first preferred embodiment of the control circuit shown in FIG. 2A and 2B according to the present invention.
Figure 2B:
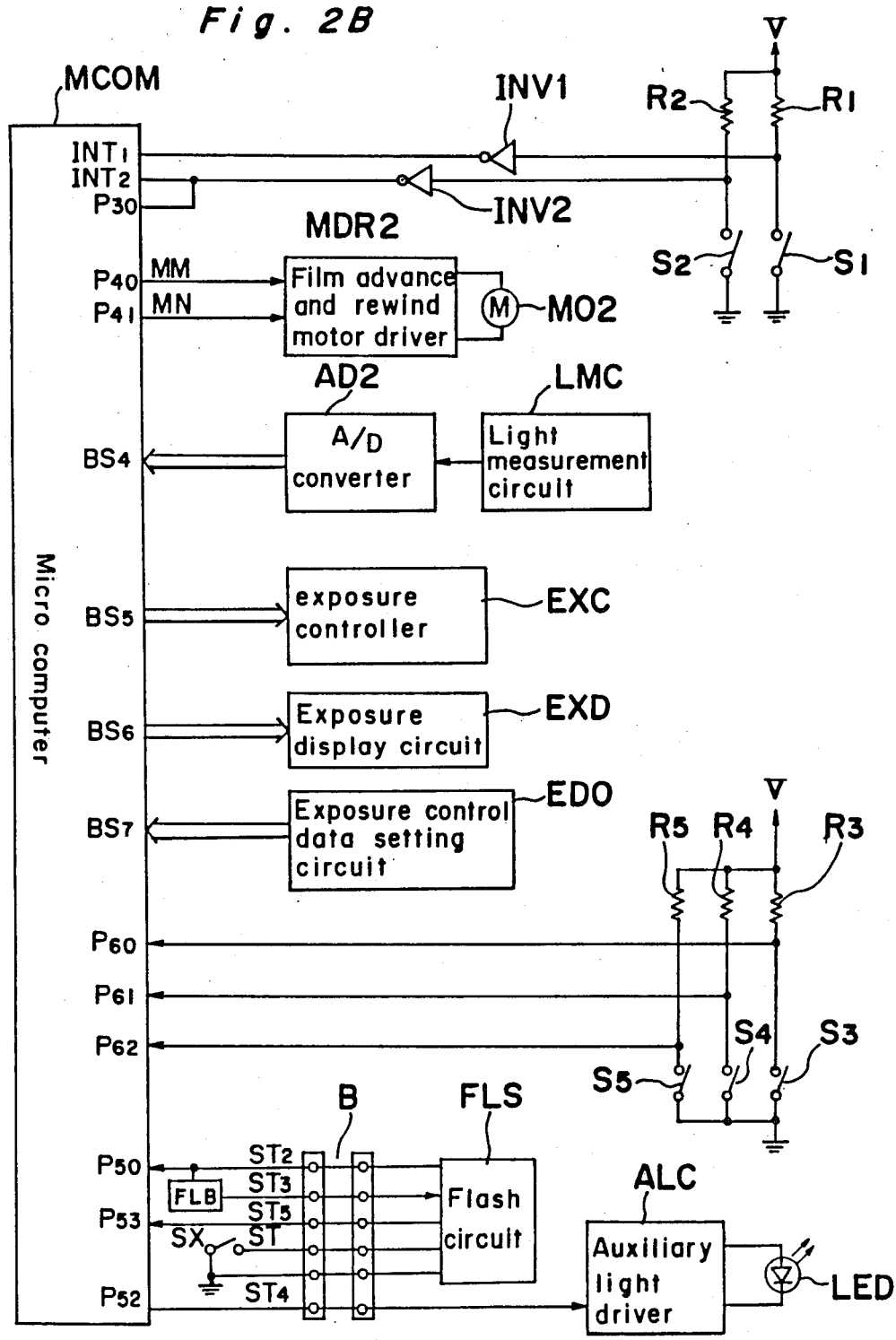

FIGS. 2A and 2B are schematic diagrams of a control circuit of the automatic focus camera shown in FIG. 1. In FIGS. 2A and 2B, 8 bit microcomputer MCOM is provided for controlling the whole of the camera, such as the aforementioned automatic focus adjustment and the exposure control etc., and the microcomputer MCOM corresponds to the AF controller 128 shown in FIG. 1.

S1 denotes a switch which is turned on when a shutter release button is pushed down at the first step corresponding to a so-called half push down condition, and S2 denotes a switch which is turned on when the shutter release button is pushed down at the second step corresponding to a so-called push down end condition, or when the shutter release button is pushed down more deeply than the first step. When the switch S1 is turned on, the power is supplied from a power supply V (not shown) to the control circuit shown in FIGS. 2A and 2B, and a sequence operation described below such as the focus adjustment, and the light measurement etc. starts. When the switch S2 is turned on, the exposure operation starts. Each of one terminal of the switches S1 and S2 is connected to earth respectively. Another terminal of the switches S1 and S2 is pulled up by a voltage supply V via resistors R1 and R2 respectively, and is connected to interrupt input terminals INT1 and INT2 of the microcomputer MCOM via inverters INV1 and INV2, respectively.

CCD image sensor FLM corresponds to the AF sensor module 121 shown in FIG. 1, and encloses a reference signal generator RS and a monitor circuit MC. The monitor circuit MC generates a brightness signal AGCOS designating a rate of the integration of the CCD image sensor FLM, and the reference signal generator RS generates a reference signal DOS designating the reference level of a brightness signal AGCOS and image signals OS outputted from the CCD image sensor FLM.

IF1 to IF 6 and OR1 denote circuits enclosed in the aforementioned interface circuit 122 shown in FIG. 1, and the operation of the circuits IF1 to IF6 and OR1 will be described below in details referring to the operation of the CCD image sensor FLM.

First of all, the CCD image sensor FLM is initialized and starts integrating the inputted image when a high level pulse of an integration clear signal ICG is inputted from the terminal P03 of the microcomputer MCOM to the CCD image sensor FLM. At the same time, the reference signal generator RS and the monitor circuit MC are initialized. As soon as the CCD image sensor FLM starts integrating the image, the reference signal generator RS generates the reference signal DOS, and the brightness monitor circuit MC generates the brightness signal AGCOS.

The AGC controller IF2 detects the brightness of the object by detecting the difference between the brightness signal AGCOS and the reference signal DOS, and judges the timing to stop integrating the image in the CCD image sensor FLM. If the difference between the signals AGCOS and DOS is larger than a predetermined threshold level, the AGC controller IF2 outputs an integration stop signal TINT for stopping the integration to the terminal P01 of the microcomputer MCOM, and also outputs the signal TINT to the SH pulse generator IF3 and the sensor driving pulse generator IF4 via an OR gate OR1.

When the integration stop signal TINT is inputted to the SH pulse generator IF3, the SH pulse generator generates an integration stop signal SH for stopping the integration to the CCD image sensor FLM. On the other hand, in response to the integration stop signal TINT, the sensor driving pulse generator IF4 converts a clock pulse $\phi$out outputted from the microcomputer MCOM to sensor drive pulses $\phi 1$ and $\phi 2$ having a different phase from each other, and outputs the clock pulses $\phi 1$ and $\phi 2$ to the CCD image sensor FLM.

On the other hand, after the microcomputer MCOM outputs the integration clear signal ICG, the microcomputer MCOM starts counting for a predetermined time, monitoring the terminal P01. When the object is in the low brightness condition, or the integration stop signal TINT is not inputted to the terminal P01 even though the microcomputer MCOM completes counting for a predetermined time, the microcomputer MCOM outputs a high level pulse of an integration stop signal MSH from the terminal P02 to the SH pulse generator IF3 and the sensor driving pulse generator IF4 via the OR gate OR1, so that the CCD image sensor FLM stops the integration.

As described above, when the object is in a high brightness, the AGC controller IF2 makes the CCD image sensor FLM stop the integration, on the other hand, when the object is in a low brightness, the microcomputer MCOM makes the CCD image sensor FLM stop the integration. After stopping the integration, in accordance with the aforementioned sensor drive pulses $\phi 1$ and $\phi 2$, the CCD image sensor FLM outputs the stored signals in each of the pixel as image information signals OS.

The subtraction circuit IF1 calculates the difference between the image information signal OS and the reference signal DOS, and outputs the subtractive signal to the amplifier IF5. The amplifier IF5 amplifies the subtractive signal outputted from the subtraction circuit IF1 so that the amplified signal becomes a suitable signal level for the analog-digital converter IF6 (referred to hereinafter as A/D converter), wherein the amplification factor of the amplifier IF5 is determined by a signal outputted from the AGC controller IF2 via an output bus, in reference with the subtractive signal between the reference signal DOS and the brightness signal AGCOS which are inputted to the AGC controller IF2 when the integration is stopped, and the amplification factor is selected from one of $\times 1$, $\times 2$, $\times 4$, and $\times 8$ and is arranged.

When the integration is stopped by the integration stop signal TINT outputted from the AGC controller IF2, the amplification factor is arranged as $\times 1$, on the other hand, when the integration is stopped by the integration stop signal MSH outputted from the microcomputer MCOM, the amplification factor is selected from one of $\times 1$, $\times 2$, $\times 4$, and $\times 8$ in accordance with the brightness of the object. The amplification factor is referred to hereinafter as AGC data. The AGC data is outputted from the AGC controller IF2 to the amplifier IF5 and the terminals BS2 of the microcomputer MCOM via the output bus.

Each of the image information outputted from the CCD image sensor FLM is analog-digital converted by the A/D converter IF6 and is outputted to the terminals BS1 of the microcomputer MCOM.

The construction and the operation of the interface circuit 12 shown in FIG. 1 is described above, and the detailed explanation is described in the Japanese patent laid open No. 125817/1985 applied by the present applicant. The more detailed explanation is not described, because the construction and the operation of the interface circuit 12 is not the subject matter of the present invention.

Next, the construction and the operation of the control circuit for driving the photograph lens will be described below in details.

A motor MO1 is provided for moving the lens group FL for focus adjustment. A motor driver MDR1 is provided for driving the motor MO1, and the motor driver MDR1 makes the lens group FL for focus adjustment move forward and backward, and stop, in accordance with signals AFMTB, AFMTR and AFMTF respectively outputted from the terminals P10, P11, P12 of the microcomputer MCOM. An encoder pulse generator ENC is enabled by the signal AFPEN from the terminal P14 of the microcomputer MCOM, and the encoder pulse generator ENC generates a pulse signal AFP corresponding to the rotation quantity of the motor MO1 to the interrupt terminal INT3 of the microcomputer MCOM. In the preferred embodiment, the encoder pulse generator ENC generates 16 pulses per one rotation of the motor MO1. In accordance with the pulse signal AFP, the microcomputer MCOM detects the rotation quantity of the motor MO1 and outputs the signals AFMTB, AFMTR, and AFMTF respectively from the terminals P10, P11 and P12 in order to control the motor MO1, as described above. Table 1 shows the control condition of the motor MO1 for the signals AFMTB, AFMTR and AFMTF.

The lens circuit LEC corresponds to the lens circuit 125 of the zoom lens LZ shown in FIG. 1, and in accordance with a start signal CS outputted from the terminal P20 of the microcomputer MCOM, and the lens circuit LEC transmits the lens data of the zoom lens LZ in serial to the terminal P22 of the microcomputer MCOM with a synchronizing signal SCK outputted from the terminal P21 of the microcomputer MCOM. The lens data outputted from the lens circuit LEC includes the conversion factor K for converting the defocus value DF of the zoom lens LZ to the rotation number of the motor MO1, an infrared rays correction quantity $\Delta IR_{800}$ for correcting the focal position of the zoom lens LZ due to the color aberration of the zoom lens LZ and an open aperture value Av of the zoom lens LZ for calculating the exposure control value of the camera.

The conversion factor K is defined by the following equation.

$$K = N/DF$$

where
- N is a count number of the pulse signal AFP outputted from the encoder pulse generator ENC, and
- DF is the defocus value DF of the zoom lens LZ calculated by the the microcomputer MCOM from the image information output from the CCD image sensor FLM.

The conversion factor k and value $\Delta IR_{800}$ are changed corresponding to the change of the focal length by the zooming of the zoom lens LZ. Therefore, the conversion factor K and value $\Delta IR_{800}$ at the set focal length are selected out by a zoom position detection encoder (not shown) and fed to the microcomputer MCOM.

In accordance with the high level start signal CS outputted from the terminal P20 of the microcomputer MCOM, the lens circuit LEC is enabled, and the lens circuit LEC outputs the lens data SIN in serial synchronizing to the the synchronizing signal SCK to the terminal P22 of the microcomputer MCOM.

The microcomputer MCOM calculates the defocus value DF from the image information output from the CCD image sensor FLM, and calculates the rotation quantity of the motor MO1 from the calculated defocus value DF and the conversion factor K of the lens data input from the lens circuit LEC. Then, the microcomputer MCOM performs the operation of the automatic focus adjustment in accordance with the rotation quantity of the motor MO1, and when the operation of the automatic focus adjustment is completed, the microcomputer MCOM outputs the completion of the automatic focus adjustment to the focus condition display circuit DDC through the terminals BS3 so that the result is displayed by a focus condition display circuit DDC.

A motor driver MDR2 is provided for driving a motor M02 for advancing and rewinding the film, the motor driver MDR2 is controlled by the signals MM and MN input from the terminals P40 and P41 of the microcomputer MCOM. Table 2 shows the control operation of the motor MO2 for the signals MM and MN.

A light measurement circuit LMC is provided for control the exposure of the camera, and the light measurement circuit LMC outputs the measurement data to an A/D converter AD2. The A/D converter AD2 analog-digital converts the measurement data and outputs the A/D converted measurement data to the terminal BS4 of the microcomputer MCOM.

An exposure control data setting circuit EDO is provided for inputting a film sensitivity and an exposure control mode set by the photographer to the terminal BS7 of the microcomputer MCOM.

In accordance with the aforementioned data input from the light measurement circuit LMC, the lens circuit LEC and the exposure control data setting circuit EDO, the microcomputer MCOM calculates the exposure control value and outputs the exposure control value to the exposure control circuit EXC from the terminal BS5, and also outputs the exposure control value to the exposure display circuit EXD from the terminal BS6, so that a desired exposure control operation is performed and the exposure control value is displayed by the exposure display circuit EXD.

A film advance mode selecting switch S3 is provided for selecting one shot photograph or continuous photograph. A priority mode selecting switch S4 is provided for giving the priority to the automatic focus operation or the release operation when the release switch S2 is closed. An AF mode selecting switch S5 is provided for selecting a one shot AF mode which inhibits the AF operation after an in-focus condition is attained, or a continuous AF mode which continuously performs the AF operation.

The respective one terminals of the switches S3, S4 and S5 is connected to earth, respectively. Another terminal of the switches S3, S4 and S5 is pulled up by a voltage supply V via pull up resistors R3, R4 and R5 respectively, and is respectively connected to the terminals P60, P61 and P62 of the microcomputer MCOM. Table 3 shows the control condition for the switching condition of the switches S3, S4 and S5.

The flash driver FLS and the auxiliary light driver ALC correspond to the flash circuit 126 and the auxiliary light driver 127 of the electric flash device FS shown in FIG. 1, respectively. The flash driver FLS is connected to the terminals P50 and P53 of the microcomputer MCOM via the connector B, and the auxiliary light driver ALC is connected to the terminal P52 via the connector B. The flash driver FLS outputs a charge completion signal ST2 representing that a main capacitor of the flash device is charged up to a given level to the terminal P50 of the microcomputer MCOM, and outputs an auxiliary light mount signal ST5 representing that the mounted flash device has a function to emit an auxiliary light to the terminal P53 of the microcomputer MCOM. On the other hand, the microcomputer MCOM outputs a stop signal ST3 for terminating the flash light emission to the flash driver FLS via a flash light control circuit FLB for controlling the timing to interrupt or terminate the flash light emission of the electric flash device FS. The microcomputer MCOM outputs an auxiliary light control signal ST4 from the terminal P52 to the auxiliary light driver ALC, wherein the auxiliary light control signal is used for controlling turning on and off of an infrared rays light emitting diode LED used as an auxiliary light emitter detecting the focal point. SX denotes a synchro switch SX of the camera. One terminal of the switch SX connected to earth and another terminal thereof is connected to the flash driver FLS via the connector B, wherein the switching condition of the switch SX is transferred to the flash driver FLS.

Next, the control operation of the preferred embodiment of the aforementioned automatic focus camera will be described below referring to the flow chart of FIGS. 3A to 3F.

When the shutter release button is pushed down at the first step, the switch S1 is turned on, resulting in that the high level interrupt signal is inputted into the interrupt terminal INT1 of the microcomputer MCOM. In accordance with the interrupt signal into the interrupt terminal INT1, the microcomputer MCOM executes the program for the automatic focus adjustment and the automatic exposure control etc. corresponding to the flow chart shown in FIGS. 3A to 3F starting from the step 101.

The program flow goes from the step 101 to the step 102, the CCD image sensor FLM is initialized. The initialization of the CCD image sensor FLM is described in the Japanese patent laid open No. 241007/1985, and it is not described in this specification because it is not the essential to the present invention. Next, at the step 105, various flags are initialized. Table 4 shows the initialized flags with their function. Moreover, the program flow goes to an integration routine CDINTA starting from the step 106.

The steps 108 and 109 are a judgment routine whether the auxiliary light is to be emitted or not. At the step 108, if an auxiliary light mode flag ALMF is "1", the program flow goes to the step 109 to judge whether or not a low contrast search inhibit flag LSIF is "1".

The meaning of the low contrast search will be described below. Even though the low contrast condition is detected at the focus condition detection, which only shows that the object is in a low contrast condition only in the defocus cover range shown in the equation (3). Therefore, the object may be in the non-low contrast condition at the lens position without the defocus cover range. It is necessary to repeatedly measure the distance moving the photograph lens from the nearest position to the infinity position and judge whether or not the object is in the low contrast condition within the whole range of the photographed distance. Therefore, it is called "low contrast search" to repeatedly measure the distance driving the lens until it is detected that the object is not in the low contrast condition.

At the step 109, if the low contrast search inhibit flag LSIF is "0" or the low contrast search is permitted, the program flow goes to the step 110. At the step 110, 80 msec is set as a maximum integration time Tmax of the CCD image sensor FLM, and at the step 111, the auxiliary light control signal ST4 is made high level. Then, the auxiliary light driver ALC is enabled and the light emitting diode LED starts lighting. Next, at the step 112, the microcomputer MCOM waits for 5 msec in order to recover the time response of the CCD image sensor FLM for a brightness change of the object after the light emitting diode LED starts lighting, and then, at the step 114, the CCD image sensor FLM starts the integration operation.

On the other hand, if the auxiliary light mode flag ALMF is "0" at the step 108, or if the low contrast search inhibit flag LSIF is "1", the auxiliary light is not turned on, and 20 msec is set as the maximum integration time Tmax at the step 113, the program flow goes to the step 114, and the CCD image sensor FLM starts the integration operation.

After the CCD image sensor FLM starts the integration operation, it is judged whether or not the high level integration stop signal TINT to be input from the AGC controller IF2 is detected at the step 115. If the high level integration stop signal TINT is detected due to the completion of the integration within the maximum integration time Tmax, the program flow goes to the step 118, on the other hand, if the high level integration stop signal TINT is not detected, the program flow goes to the step 116. At the step 116, it is judged whether or not the count time T is larger than the maximum integration time Tmax arranged at the steps 110 or 113. If the count time T is larger than Tmax, the program flow goes to the step 117, on the other hand, if the count time T is not larger than Tmax, the program flow goes back to the step 115. At the step 117, the microcomputer MCOM outputs the integration stop signal MSH to the CCD image sensor FLM via the OR gate OR1 and the SH pulse generator IF3, then the microcomputer calculates the integration time based on the count time at the steps 1171 and 1172. At the step 118 shown in FIG. 3C, the microcomputer MCOM outputs the low level auxiliary light control signal ST4 to the auxiliary light driver ALC, so that lighting of the light emitting diode LED is stopped.

Next, at the step 119, the microcomputer MCOM latches the AGC data inputted from the AGC controller IF2, and then, at the step 120, the microcomputer MCOM makes the CCD image sensor FLM start the integration operation of the next cycle, and the microcomputer MCOM starts detecting the light measurement data from the light measurement circuit LMC via the A/D converter AD2 at the step 121. Moreover, at the step 122, the microcomputer MCOM latches the aforementioned 8 bit pixel data detected in the CCD image sensor FLM at the steps 114 to 117. The latch operation of the microcomputer MCOM is referred to hereinafter as data dump. In parallel with the data dump operation, the microcomputer MCOM calculates the pixel peak value P of the equation (4) and the contrast value C of the equation (5).

Next, at the step 123, the microcomputer MCOM communicates with the lens circuit LEC of the zoom lens LZ so that the microcomputer MCOM latches the conversion factor K, the open aperture value Avo, and the infrared rays correction value $\Delta IR_{800}$ and the auxiliary light mount signal. Moreover, at the step 124, the microcomputer MCOM calculates the defocus value DF of the equation (2) from the latched pixel data.

At the steps 125 to 127, the microcomputer MCOM performs the exposure calculation. First of all, at the step 125, the microcomputer MCOM latches the light measurement data whose detection has been started at the step 121, and then, at the step 126, after the microcomputer MCOM latches the aforementioned set exposure control data and the data of the AF mode described in Table 3, the flags designating each of the modes are arranged. Next, at the step 127, the microcomputer MCOM calculates the exposure control value, and then, at the step 128, the calculated data for the exposure control is displayed by the exposure display circuit EXD. Moreover, at steps 129 and 130, it is judged whether or not lighting of the auxiliary light is performed during the integration of the CCD image sensor FLM, by judging the auxiliary light mode flag ALMF and the low contrast search inhibit flag LSIF. If the auxiliary light mode flag ALMF is "1" and the low contrast search inhibit flag LSIF is "0", or if lighting of the auxiliary light is performed during the integration of the CCD image sensor FLM, the program flow goes to the step 131.

At the step 131, the correction of the infrared rays correction quantity $\Delta IR$ is performed.

Figure 4:
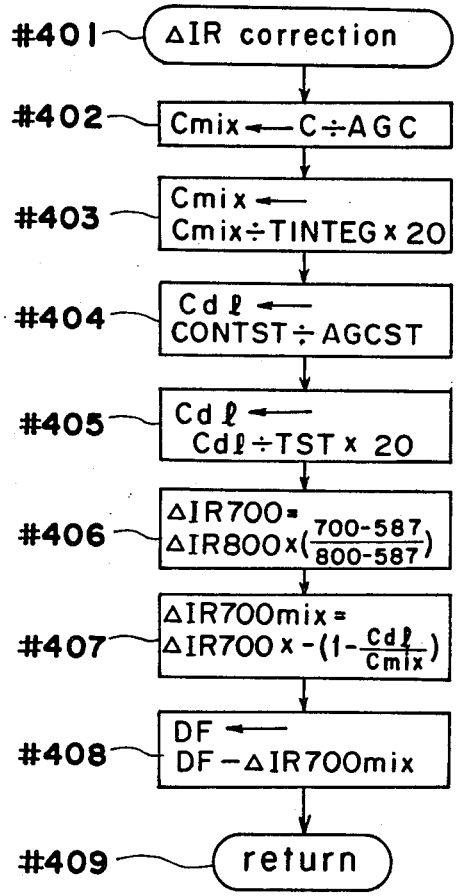
FIGS. 4 and 5 are flow charts showing control operations during a Δ IR correction of the control circuit shown in FIGS. 2A and 2B, FIGS. 6A to 6C are flow charts showing a control operation during a low contrast searching of the control circuit shown in FIGS. 2A and 2B.

The correction of the $\Delta IR$ is made under the control of the sub routine shown in FIG. 4.

As shown in the equation (13), the correction is made using either the contrast of the object when the auxiliary light is emitted and the contrast of the object under the ambient light.

Figure 3A:
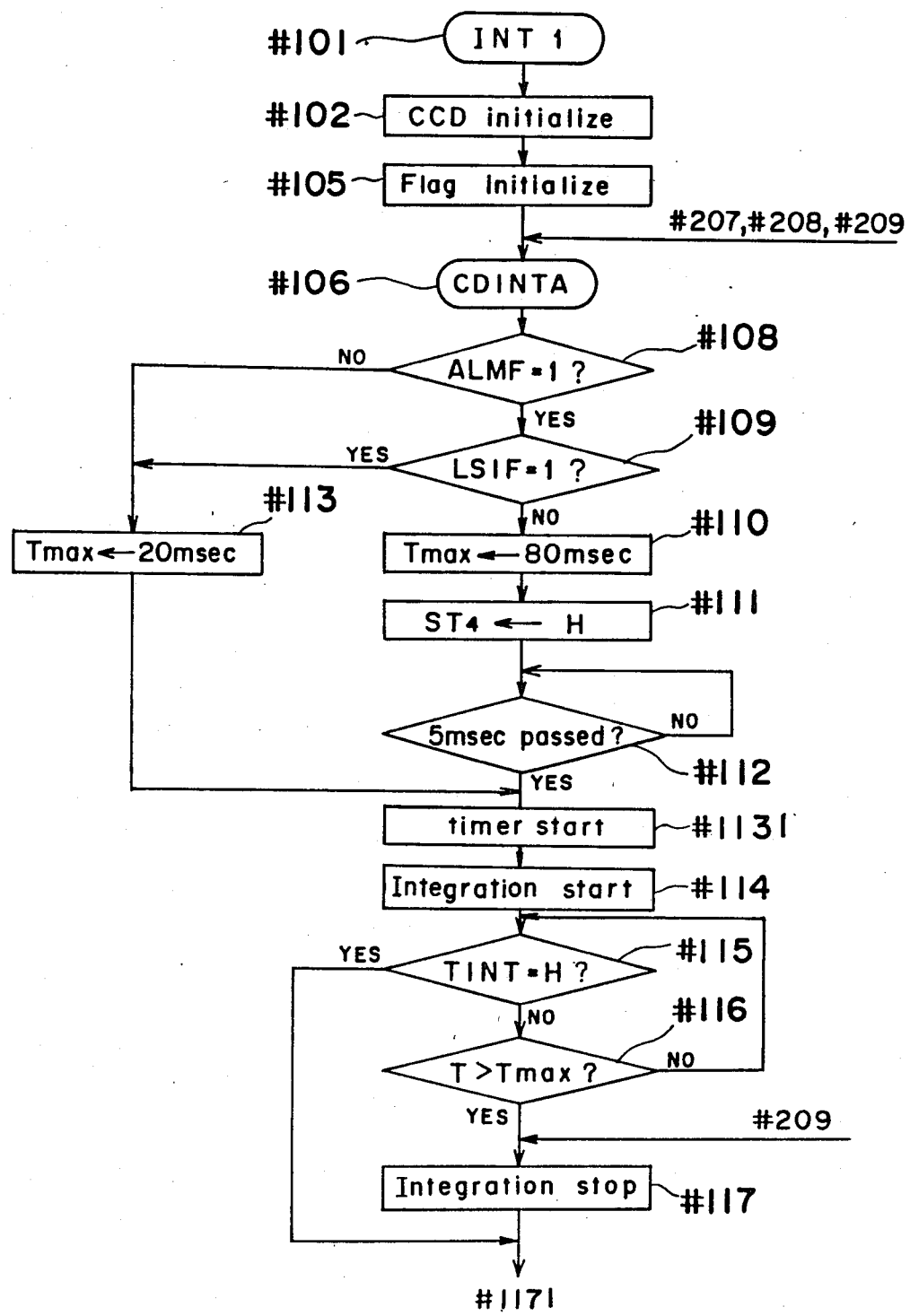
Figure 3B:
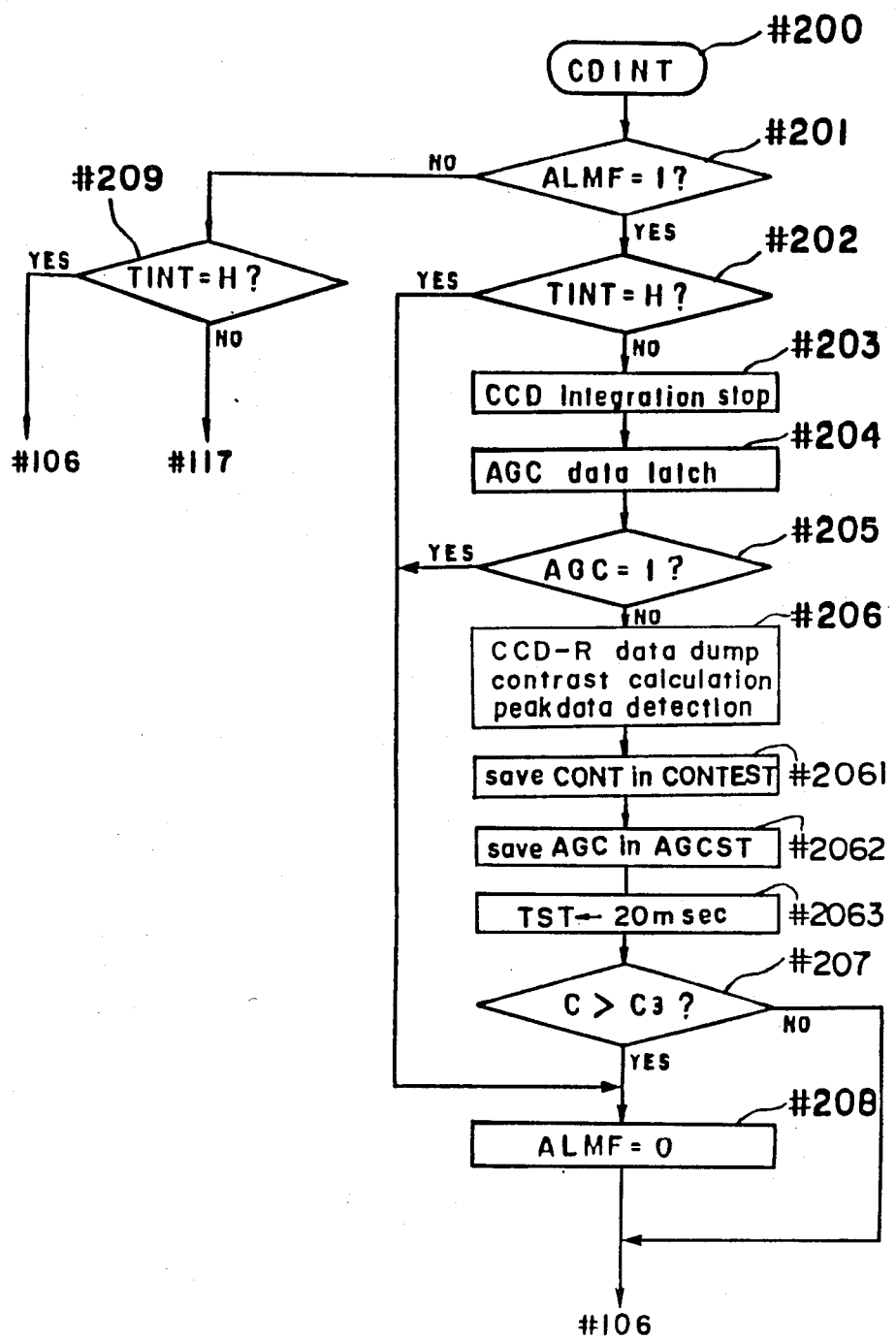
Figure 3C:
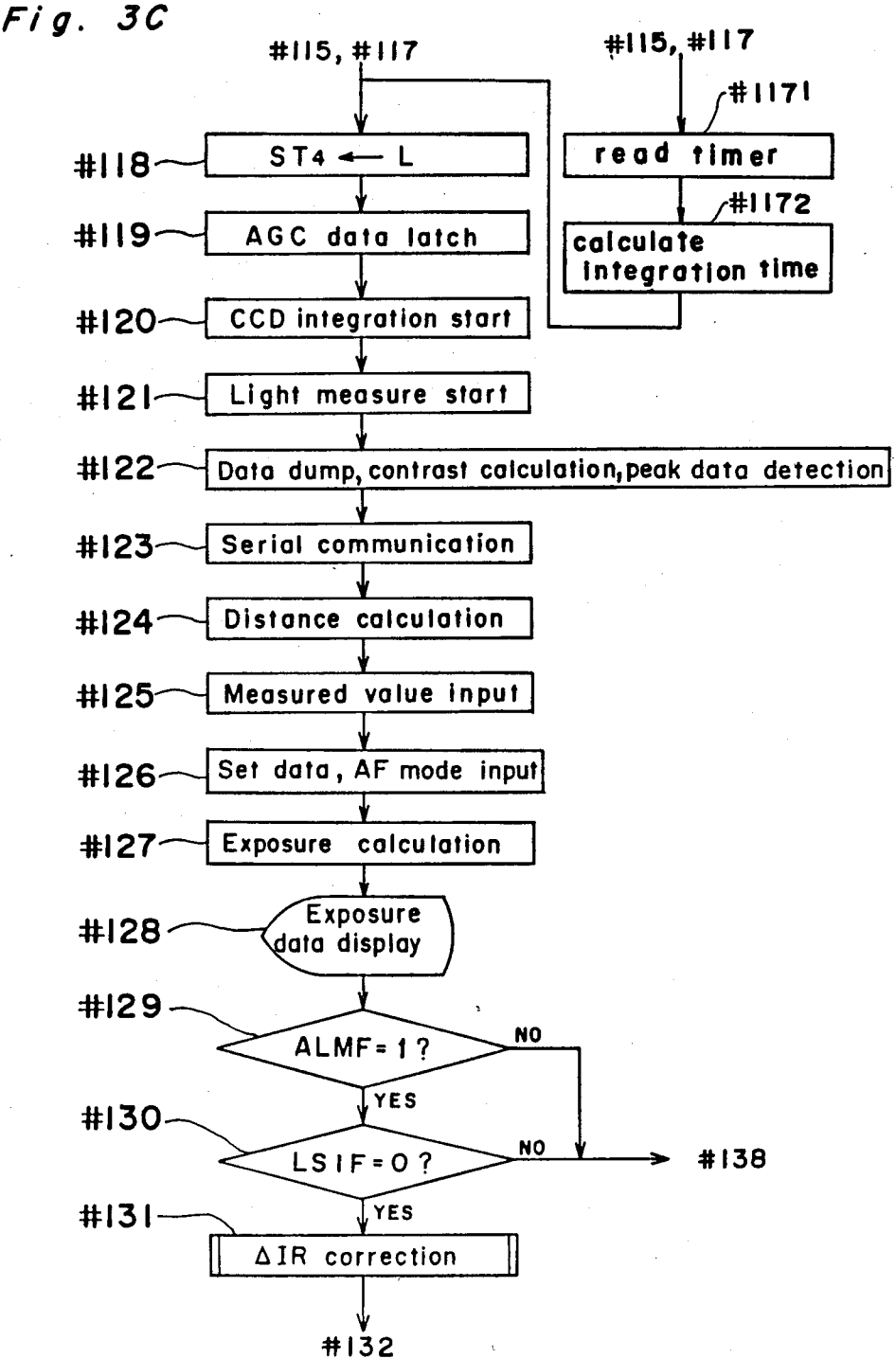

Since the $\Delta IR$ correction is made only when the auxiliary light is emitted at the steps 129 and 130 as shown in FIG. 3C, the contrast in the step 402 represents the contrast of the object at the time of the auxiliary light emission.

The contrast is divided by AGC data so as to obtain the contrast when the AGC data is 1. The contrast is divided by the integration time TINTEG of the image sensor, then multiplied with 20, whereby the mixed contrast Cmix for the case of integration time 20 msec. AGC X1 is obtained in the step 403.

Similarly, the contrast of the object under the ambient light for the integration time 20 msec. AGC X 1 is obtained. The contrast under the ambient light is stored in the RAM of the microcomputer MCOM under the name CONTST and is updated every time of the integration of the image sensor when the auxiliary light is not emitted. The contrast data CONTST is divided by the AGC data AGCST, the contrast for AGC X 1 under the ambient light is obtained in the step 404. The contrast thus divided by the AGC data is divided by the integration time TST for the ambient light and multiplied with 20, the contrast at the time of the integration time 20 msec. AGC X 1 under the ambient light can be obtained in the step 405. Subsequently, the color aberration $\Delta IR_{700}$ for the light of 700 nm is calculated in the step 406 by the equation (9).

$$\Delta IR_{700} = \Delta IR_{800} \times (700-587)/(800-587)$$

Moreover, in the step 407, the color aberration $\Delta IR_{800}$ on the axis of the mixed light under the auxiliary light emission is obtained by multiplying the $\Delta IR_{700}$ obtained in the step 406 with $(1 - Cd\ 1/Cmix)$. Subsequently, the detected defocus value DF is subtracted by $\Delta IR_{700}$mix so as to obtain the true defocus value in the step 408. Then the program goes to the next steps 132 to 134 shown in FIG. 3D wherein the reliability of the measured distance is checked. That is, it is judged whether or not the pixel peak value P shown by the equation (4) is larger than a predetermined threshold value P1 at the step 132, it is judged whether or not the contrast value C shown in the equation (5) is larger than a predetermined threshold value C1 at the step 133, and it is judged whether or not the correlation level value YM of the equation (6) is smaller than a predetermined threshold value YM1.

Larger the pixel peak value P and the contrast value C become, or smaller the correlation level value YM becomes, the reliability of the measured distance becomes higher. Therefore, if $P > P1$, $C > C1$, and $YM < YM1$, it is judged that the measured distance has a high reliability, then, the program flow goes to the step 135. At the step 135, the low contrast search inhibit flag LSIF, low contrast searching flag LSDF and a flag LSF designating a detecting times of the extreme position of the photograph lens are reset into "0". On the other hand, when $P \leq P1$, $C \leq C1$, or $YM \geq YM1$, it is judged that the reliability of the measured distance is low, and then, the program flow goes to the step 136. After the in-focus flag IFF is reset into "0" at the step 136, the program flow goes to the step 137 of the low contrast process routine in the case when the distance can not be measured.

On the other hand, in case the auxiliary light is not emitted, the program flow goes to the step 1311 in which the integration time (ITIME) calculated at the step 1172 is stored in the RAM. The integration time ITIME is used as the integration time data TST in the process of $\Delta IR$ correction routine. In the steps 1312 and 1313, the contrast data and AGC data are stored in the RAM and used in the $\Delta IR$ correction routine. These data are respectively updated every time the integration of the CCD image sensor is performed. Then the program flow goes to the reliability test routine shown in FIG. 3E. It is judged whether or not the pixel peak value P is larger than a predetermined threshold value P2. Moreover, at the step 139, it is judged whether or not the contrast value C is larger than a predetermined threshold value C2, and at the step 140, it is judged whether or not the correlation level value YM is smaller than a predetermined threshold value YM2. If $P > P2$, $C > C2$, and $YM < YM2$, it is judged that the reliability of the measured distance is high, and then, the program flow goes to the step 135 shown in FIG. 3D. On the other hand, if $P \leq P2$, $C \leq C2$, or $YM \geq YM2$, it is judged that the reliability of the measured distance is low, and then, the program flow goes to the step 141. At the step 141, it is judged whether or not the auxiliary light mount signal ST5 is high, that is, whether or not the auxiliary light device AL is mounted. If the auxiliary light device AL is mounted, the program flow goes to the step 142, it is judged whether or not the amplification factor output from the AGC controller IF2 is "1". If the the amplification factor is not "1", or the amplification factor is "2", "4", or "8", it is judged that the object is in a dark condition, and then, at the step 143, "1" is set in the auxiliary light mode flag ALMF, and the program flow goes to the step 144 of an integration routine CDINTA starting from the step 106 shown in FIG. 3A.

Thereafter the auxiliary light mode is executed to emit the auxiliary light for the focus detection. The data stored in the RAM in the steps 1311, 1312 and 1313 are used in the next cycle of the $\Delta IR$ correction.

On the other hand, if the auxiliary light mount signal ST5 is low at the step 141, or if the amplification factor is "1", the program flow goes to the aforementioned step 132, and then, the judgment of the pixel peak value P, the contrast value C, and the correlation level value YM are performed.

The aforementioned threshold values P1, C1, YM1, P2, C2, and YM2 are arranged so that P1<P2, C1<C2, and YM1>YM2, resulting in that the reliability of the measured distance at the steps 138, 139 and 140 is judged more severely than the judgment of the reliability of the measured distance at the steps 132, 133 and 134. When the auxiliary light is not turned on during the integration of the CCD image sensor FLM, larger reference threshold levels (at the steps 138 to 140) are arranged than the reference threshold levels at the steps 132 to 134. If the judged values are not satisfied with the larger reference threshold levels, the program flow goes to the auxiliary light mode routine starting from the step 141. At the auxiliary light mode, if the auxiliary light device is not mounted or the reliability of the measured distance is low even though the object is in an enough bright condition, the program flow goes to the steps 132 to 134 because the auxiliary light can not be turned on, and the reliability of the measured distance having one step lower reference threshold levels is judged again. Therefore, when the auxiliary light device AL is mounted, the reference threshold levels for the judgment of the reliability of the measured distance with ambient light is raised, resulting in that the auxiliary light can be turned on properly without measuring the distance at a low reliability. On the other hand, when the auxiliary light is turned on during the integration of the CCD image sensor FLM, or when the auxiliary light can not be turned on, the reference threshold levels of the reliability is reduced, resulting in that the reliability of the operation of the distance measurement can be raised for various kinds of objects.

Figure 3D:
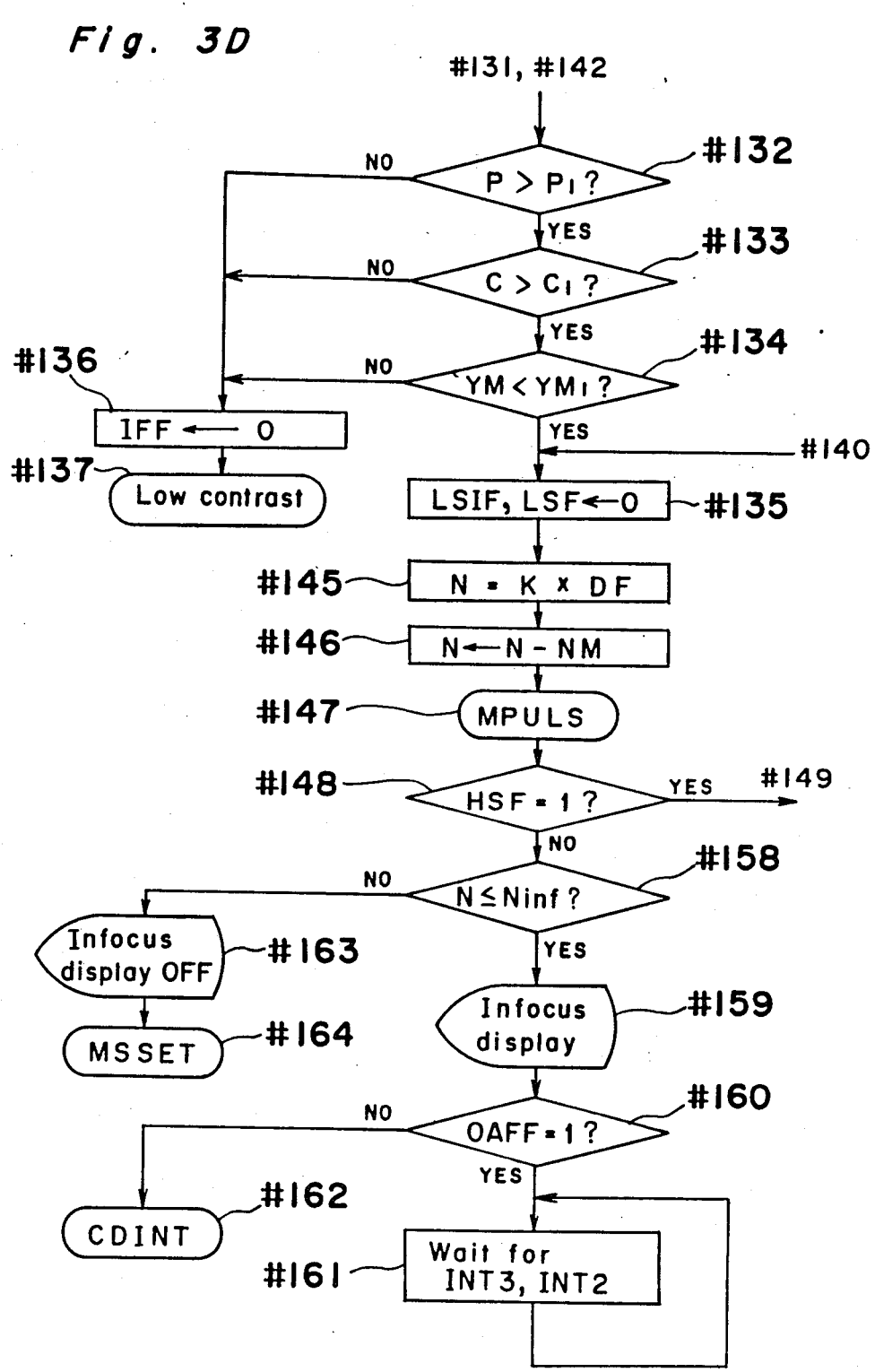
Figure 3E:
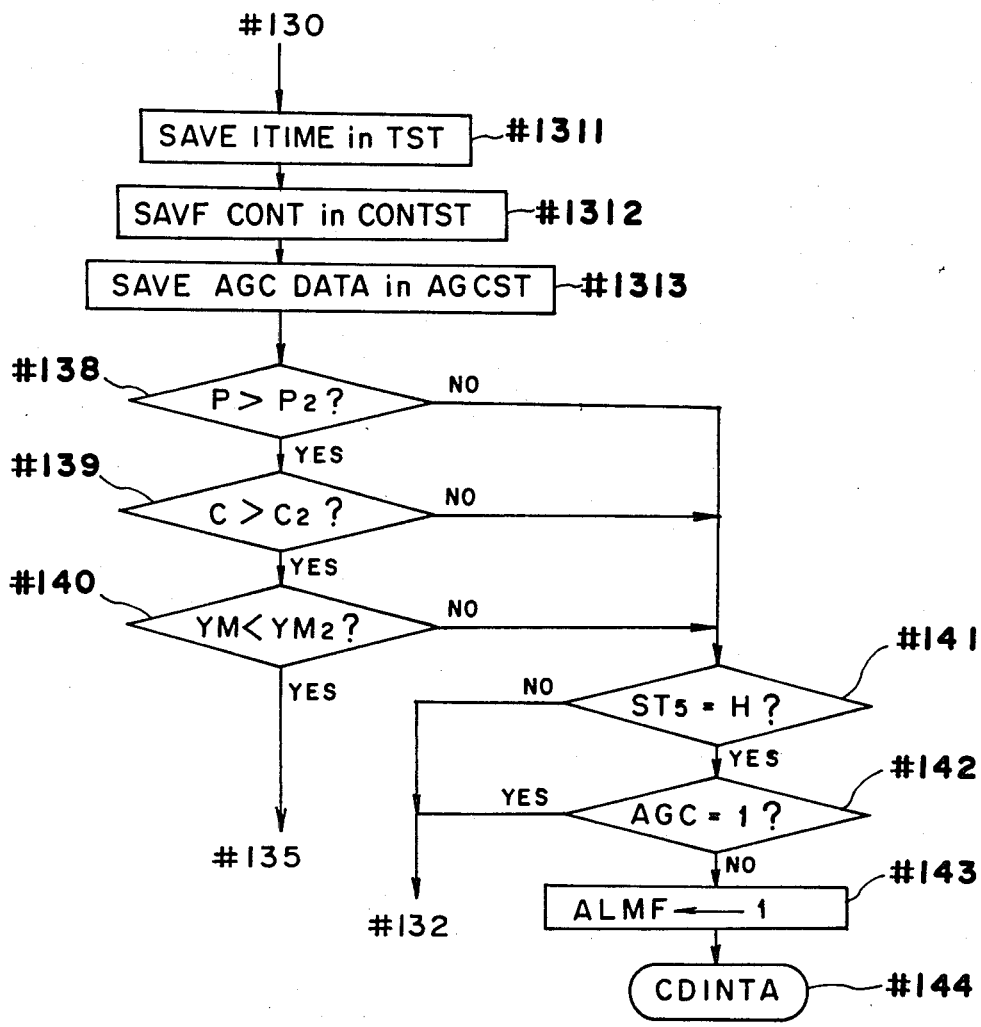

When it is judged that the reliability of the measured distance is high at the aforementioned routine, the program flow goes from the step 135 to the step 145 shown in FIG. 3D. At the step 145, the microcomputer MCOM calculates the encoder pulse count number N from the conversion factor K and the defocus value DF calculated at the step 124, and then, the program flow goes to the step 146. The encoder pulse count number N must be corrected, because the defocus value DF at the step 124 is calculated in accordance with the data representing the picture information during the integration period at steps 114 to 117. Therefore, the rotation number NM of the motor MO1 from the center timing of the integration period to the step 145, when the encoder pulse count number N is calculated, is subtracted from the calculated encoder pulse count number N, the subtracted value is newly set as the encoder pulse count number N at the step 146, wherein "0" is set as the rotation number of the motor MO1 when the motor MO1 stops.

As described above, the encoder pulse count number N for driving the motor MO1 to the in-focus position of the photograph lens can be obtained, and then, the program flow goes to a motor control routine MPULS starting from the step 147.

Figure 3F:
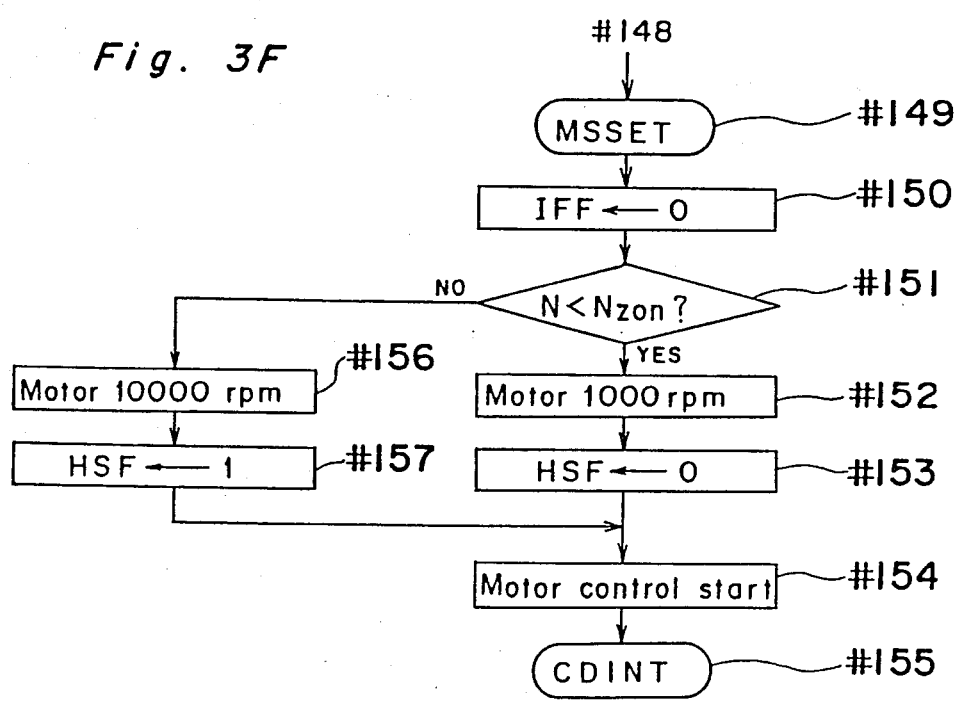

At the step 148, it is judged whether or not a high speed flag HSF is "1", if HSF is "1", or the motor MO1 rotates at a high speed of 10,000 rpm, the program flow goes to a motor control routine MSSET starting from the step 149 shown in FIG. 3F, and then, "0" is set in the in-focus flag IFF. At the next step 151, the calculated encoder pulse count number N at the step 146 is compared with a predetermined near zone pulse count number Nzon, wherein the near zone count number Nzon is provided for judging the switching of the rotation speed of the motor MO1. If the photograph lens is near to the in-focus position, or the encoder pulse count number N is smaller than the near zone pulse count number Nzon, the rotation speed of the motor MO1 is set at a low speed of 1,000 rpm at the step 152. By the above control, the motor MO1 is correctly controlled without the photograph lens's overrunning the in-focus position. After the step 152, the program flow goes to the step 153, the high speed flag HSF is set "0", and then, the control of the motor MO1 starts at the step 154, and the the program flow goes to the integration routine CDINT starting from the step 200 shown in FIG. 3B.

On the other hand, at the step 151, if the encoder pulse count number N is equal to or larger than the near zone pulse count number Nzon, the program flow goes to the step 156, the rotation speed of the motor MO1 is set at a high speed of 10,000 rpm. Then, after "1" is set in the high speed flag HSF at the step 157, the program flow goes to the step 154.

On the other hand, if the high speed flag HSF is "0" at the step 148 shown in FIG. 3D, or the motor MO1 rotates at a low speed of 1,000 rpm or the motor MO1 stops, the program flow goes to the step 158, the encoder pulse count number N calculated at the step 146 is compared with an in-focus pulse count number Ninf designating a range of a predetermined in-focus condition. If the encoder pulse count number N is equal to or smaller than the in-focus pulse count number Ninf, it can be judged that the photograph lens is positioned at the in-focus position, and then, the in-focus condition is displayed at the step 159. Moreover, it is judged whether or not a one shot AF flag OAFF is "1" at the step 160, wherein "1" is set in the one shot AF flag OAFF when the photograph lens is positioned in an in-focus position and the driving of the photograph lens is locked. If the one shot AF flag OAFF is "1" at the step 160, the program flow goes to the step 161, the microcomputer MCOM waits for the interrupt signal inputted into the interrupt terminal INT2 or INT3. As described above, when the motor MO1 rotates at a low speed and the encoder pulse count number N calculated from the measured distance is equal or smaller than the in-focus pulse count number Ninf, the motor MO1 is driven until the encoder pulse count number N outputted from the encoder pulse generator ENC becomes Ninf without the distance measurement again, and the photograph lens is positioned and locked at an in-focus position.

At the step 160, if the one shot AF flag OAFF is "0", or the continuous AF mode during the automatic focus operation is arranged, the program flow goes to the routine CDINT starting from the step 200 shown in FIG. 3B. On the other hand, if the encoder pulse count number N is larger than the in-focus pulse count number Ninf at the step 158, the program flow goes to the step 163, the display of the in-focus condition is turned off, and then, the program flow goes to the motor speed control routine MSSET starting from the step 149 shown in FIG. 3F.

As described above, the integration of the the CCD image sensor FLM and lighting of the auxiliary light are performed not only when the motor MO1 stops but also when the motor MO1 rotates, resulting in that the automatic focus operation is performed at a higher speed than the camera of the prior art.

Furthermore, the distance measurement routine CDINT starting from the step 200 shown in FIG. 3B will be described below in details. In the distance measurement routine CDINT, "a preliminary integration" and monitoring of the peripheral light during the auxiliary light mode described below in details are performed.

First of all, "the preliminary integration" and monitoring of the outside light during the auxiliary light mode are described below in details referring to FIG. 8. FIG. 8 shows a timing chart of the integration, lighting of the auxiliary light, the data dump from the CCD image sensor FLM, as well as the contrast value calculation, the distance calculation, the AF control, the automatic exposure (referred to hereinafter as AE) calculation and the latch of the AGC data from the AGC controller IF2, performed in parallel therewith, wherein each of the operations is performed when each of the signals is high level respectively.

In FIG. 8, TA denotes a period of the auxiliary light mode, and the steps 108 to 118 are performed during the auxiliary light mode as described above. That is, first of all, the auxiliary light emission starts at a time t1, and an integration TI1 of the CCD image sensor FLM starts at a time t2 after the passage of 5 msec from the time t1. The integration TI1 stops at a time t3 from the passage of the aforementioned integration time from the time t2, the integration time being shorter than 50 msec. Then, the auxiliary light is turned off and the microcomputer MCOM latches the AGC data (AGCl) from the AGC controller IF2. Immediately after the latch of the AGC data (AGCl), an integration TI2 of the CCD image sensor FLM starts and the light measurement starts at a time t4. In parallel with the light measurement operation, the data dump DUM1 of the CCD image sensor FLM obtained at the integration TI1 is performed and the contrast value C is calculated. At a time t5 corresponding to the end timing of the data dump and the calculation of the contrast value C, the process DFC1 including the distance calculation, the AF control and the AE calculation starts.

As described above, an error of the light measurement due to the lighting of the auxiliary light is not caused, because the light measurement starts at the time t4 after the time t3 when the auxiliary light is turned off. Then, the aforementioned integration TI2 stops, at a time t6 corresponding to the end of the distance measurement, the AF control, and the AE calculation of the process DFC1. That is, after the stop of the integration TI1, the next integration TI2 starts, performing in parallel with the data dump of the CCD image sensor FLM of the pixel data obtained at the previous integration TI1 and the calculation of the contrast value C (DUM1), the distance measurement, the AF control, and the AE calculation (DFC1), and then, the integration TI2 stops at the time t6 corresponding to the end of the processes DUM1 and DFC1.

As described above, a control process is referred to as the preliminary integration which is the process that the next integration starts and processing of the integrated pixel data obtained at the previous integration is performed in parallel with the next integration after the integration of the CCD image sensor FLM. The efficiency of the integration of the CCD image sensor FLM can be raised and also the automatic focus operation is performed at a higher speed than the camera of the prior art, because the cycle time of the distance measurement is shortened.

In the preferred embodiment, it takes a constant time of approximately 20 msec from the end of the first integration to the end of the AF control operation, resulting in that it takes approximately 20 msec to perform the preliminary integration TI2. It is apparent from the flow chart of FIG. 3 that the auxiliary light is turned off during the preliminary integration. That is, at the preliminary integration TI2, the integration is performed on the condition that the auxiliary light is not turned off, and the real brightness and the real contrast value C of the object itself can be obtained on the condition that the auxiliary light is not turned off by detecting the AGC data (AGC2) and the contrast value C during the preliminary integration.

Furthermore, the distance calculation is not performed, and the latch of the AGC data and the data dump of the CCD image sensor FLM are performed, at the preliminary integration during the auxiliary light mode. Therefore, the data dump of both of the reference portion and the measurement portion of the CCD image sensor FLM is not required. In the preferred embodiment, the data dump of only the reference portion of the CCD image sensor FLM is performed, resulting in that it takes approximately half time of the normal data dump DUM1 of the CCD image sensor FLM to perform the data dump DUM2 at the preliminary integration during the auxiliary light mode. Furthermore, the brightness and the contrast value C of the object can be quickly obtained because the contrast value C is calculated in parallel with the data dump DUM2, and also the judgment can be quickly performed whether the next integration must be performed with ambient light or the auxiliary light.

In the preferred embodiment, if the object is in a bright condition, or if the AGC data is "1" and if the contrast value C is larger than a predetermined value C3, the auxiliary light mode is canceled. On the other hand, if the AGC data is "2", "4", or "8", or if the contrast value C is equal to or smaller than the predetermined threshold value C3, the auxiliary light mode is maintained and the auxiliary light is turned on at the next cycle. The predetermined threshold value C3 and its meanings will be described below in details. In the integration TI3 of FIG. 8, the auxiliary light mode is maintained by the AGC data (AGC2) and the contrast value C (DUM2), at the preliminary integration TI2, and the integration TI3 is performed with lighting of the auxiliary light.

Furthermore, the operation after the auxiliary light mode is canceled will be described above in details.

If the AGC data AGC3 at the preliminary integration TI4 is "1" or if the contrast value C calculated at DUM3 is larger than the predetermined threshold value C3, the auxiliary light mode is canceled, and the auxiliary light is not turned on during the next integration TI5. In FIG. 8, TB denotes a period when the auxiliary light mode is not arranged, in this case, the data dump (DUM4) of all the data of the the CCD image sensor FLM during the preliminary integration TI6 is performed, and the distance calculation, the AF control, and the AE calculation (DFC2) are performed.

In FIG. 8, TC denotes a period when the brightness of the object is larger than the brightness of the object during the periods TA and TB. The integration of the CCD image sensor FLM is stopped by the AGC controller IF2 before the integration time reaches the maximum integration time. That is, the processing time of the integration is shorter than 20 msec, and a preliminary integration TI7 stops before the process DFC2 corresponding the calculation of the data obtained at the integration TI6. The data of the preliminary integration TI7 is neglected, and the next integration TI8 starts after the process DFC2.

Referring to FIG. 3B again, the distance measurement routine CDINT will be described below in details, wherein the aforementioned preliminary integration and the judgment during the auxiliary light mode are performed.

First of all, at the step 201, it is judged whether or not the auxiliary light mode flag ALMF is "1", if the auxiliary light mode flag ALMF is "1", or the auxiliary light mode is arranged, the program flow goes to the step 202, it is judged whether or not the integration stop signal TINT is high. If the integration stop signal TINT is high, the program flow directly goes to the step 208, "0" is set in the auxiliary light mode flag ALMF, and then, the program flow goes to the integration routine CDINTA starting from the step 106. That is, when it is judged that the integration stops within 20 msec for the previous integration process and the object is in an enough bright condition, the auxiliary light mode flag ALMF is reset and the auxiliary light mode is canceled.

On the other hand, if the integration stop signal TINT is low at the step 202, the integration of the CCD image sensor FLM is stopped at the step 203, and then, the AGC data is latched at the step 204. Moreover, at the step 205, it is judged whether or not the AGC data is "1". If the object is in a bright condition, or the AGC data is "1", the program flow goes to the step 208, on the other hand, if the AGC data is not "1", the program flow goes to the step 206, the contrast value C is calculated in parallel with the data dump of the reference portion of the CCD image sensor FLM.

Subsequently, the contrast data is taken in the RAM of the microcomputer MCOM in the step 2061. The contrast data is used as the data CONTST for correcting $\Delta$IR in case the auxiliary light is emitted and the integration is performed. Then the AGC data is stored at the step 2062. The integration time 20 msec. in this embodiment is stored in the RAM and is used for the $\Delta$IR correction.

Then, it is judged whether or not the contrast value C is larger than the predetermined threshold C3 at the step 207. If the contrast value C is larger than C3, it is judged that the object itself has an enough contrast, the auxiliary light mode flag ALMF is reset at the step 208. On the other hand, if the contrast value C is equal to or smaller than C3, it is judged that the auxiliary light mode is to be maintained, the program flow goes to the integration routine CDINTA starting from the step 106.

The aforementioned threshold value C3 is predetermined so that C3>C2, wherein C2 is the threshold value used at the aforementioned step 139. That is, the condition for entering the auxiliary light mode is arranged more severely than the condition for going out from the auxiliary light mode, resulting in that the auxiliary light mode can not be cleared for a slightly change of the contrast value C once the auxiliary light mode is selected. Therefore, it can be prevented that the distance measurement is performed unstably because the auxiliary light mode is selected and not selected repeatedly causing a difference between the measured distance during lighting of the auxiliary light and the measured distance with ambient light.

Thus, at the preliminary integration during the auxiliary light mode, the auxiliary light is not turned on, the integration of the CCD image sensor FLM is performed with ambient light, and the latch of the AGC data, the data dump of the reference portion of the CCD image sensor FLM and the calculation of the contrast value C are performed. The brightness and the contrast of the object are judged from the latched AGC data and the calculated contrast value, and it is judged whether or not the auxiliary light mode is to be continued.

As described above, at the preliminary integration during the auxiliary light mode, the auxiliary light mode is judged only by the AGC data and the contrast value C without the auxiliary light and the calculation of the distance is not performed. Therefore, the brightness and the contrast of the object can be judged for a short time, and it can be judged quickly whether or not the auxiliary light is to be turned on for a change of the brightness and the contrast of the object.

Moreover, since the brightness and contrast of the object can be obtained in a period of the preliminary integration, the $\Delta$IR correction can be made accurately and rapidly in case the subsequent cycle is executed in the auxiliary light mode.

In the embodiment mentioned above, if it is judged that the object is in a bright condition at the step 205, or if it is judged that the object has an enough contrast at the step 207, the distance may be calculated by the data of the preliminary integration, because the possibility for performing the distance measurement with ambient light is high. That is, if the AGC data is "1" at the step 205, the auxiliary light mode may be canceled, and the program flow may go to the step 120. On the other hand, if C>C3 at the step 207, the auxiliary light mode may be canceled and the program flow may go to the step 122 to perform the data dump of the measurement portion of the CCD image sensor FLM because the data dump of the reference portion of the CCD image sensor FLM is completed, and then, the program flow may go to the step 123.

Figure 6A:
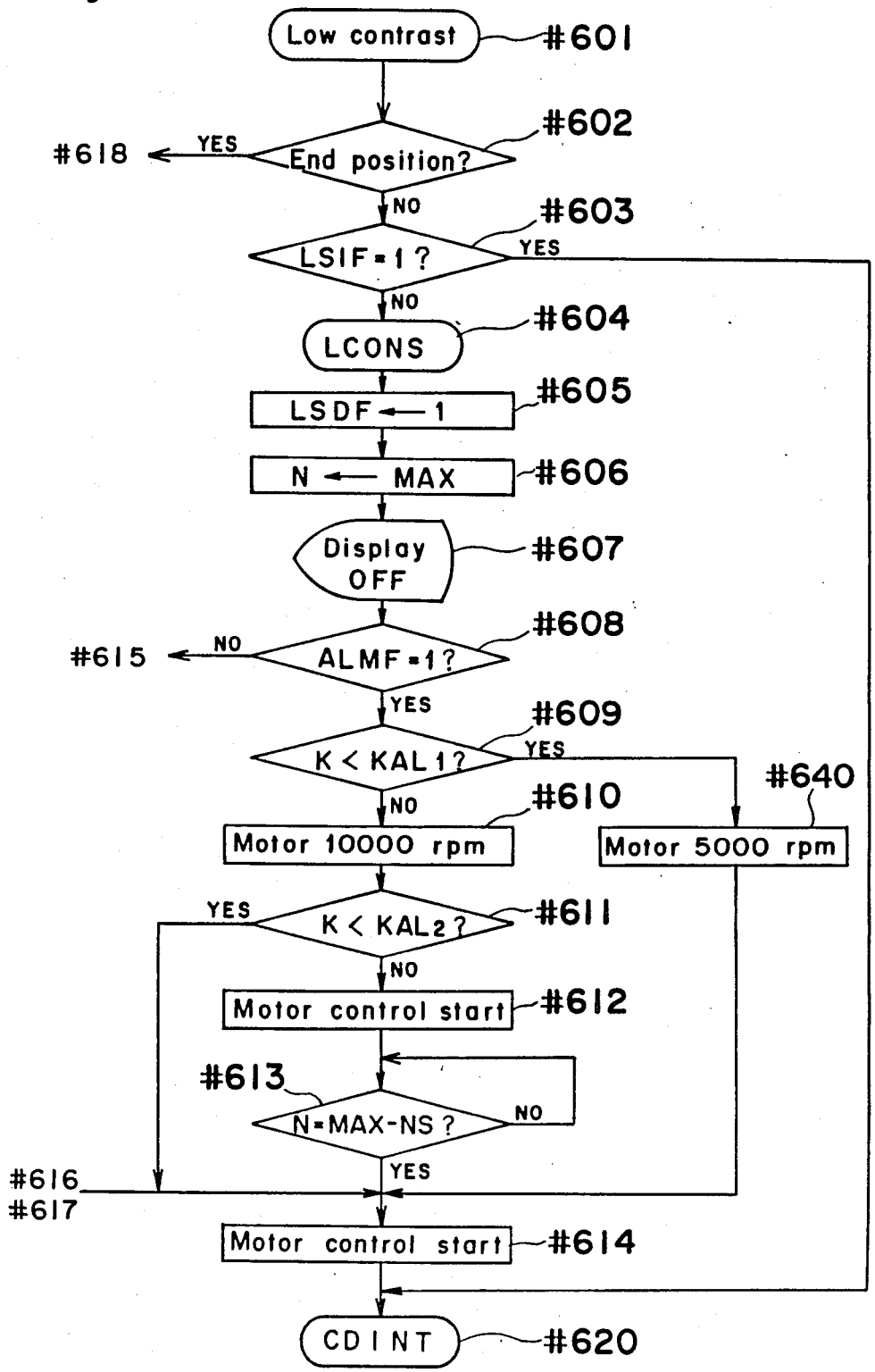
Figure 6B:
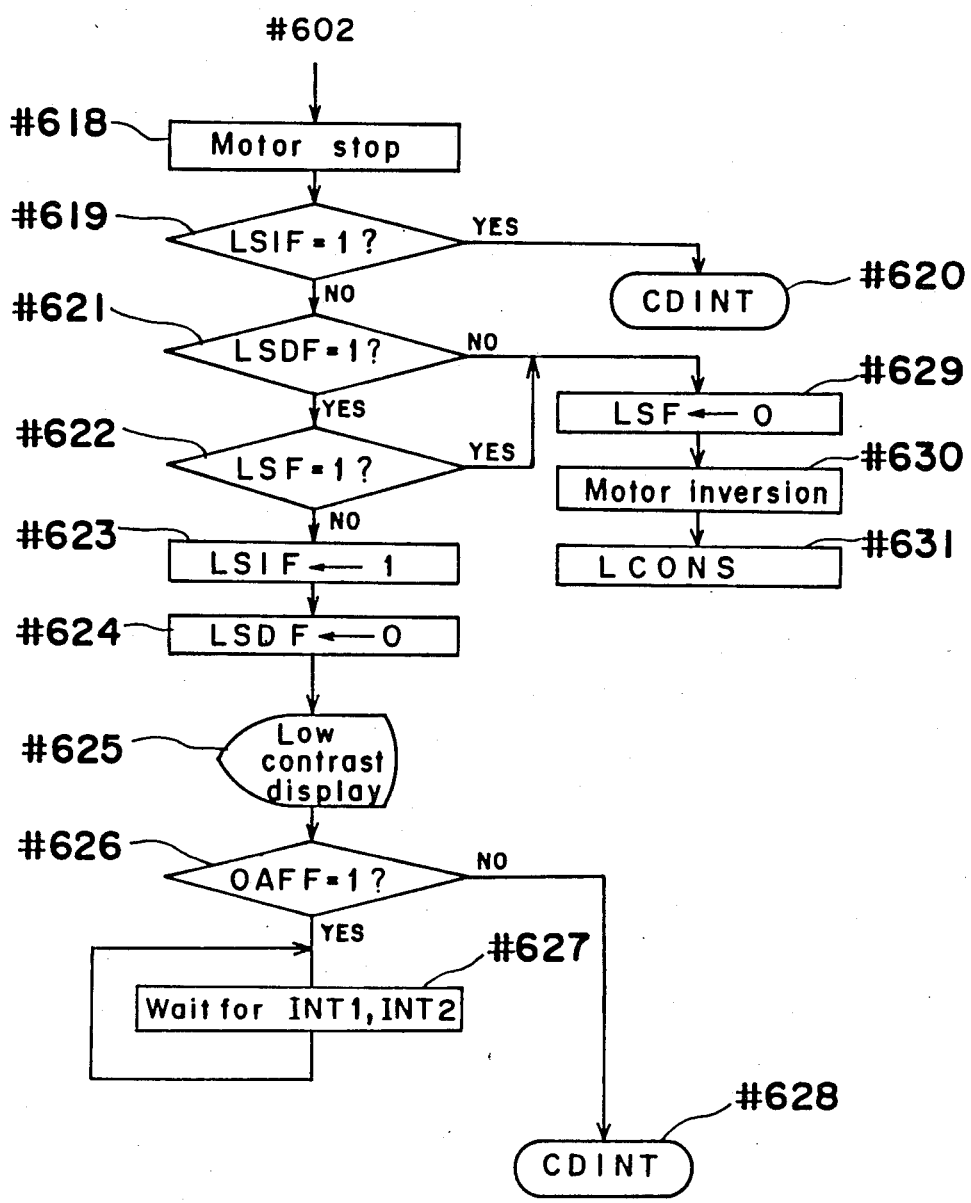
Figure 6C:
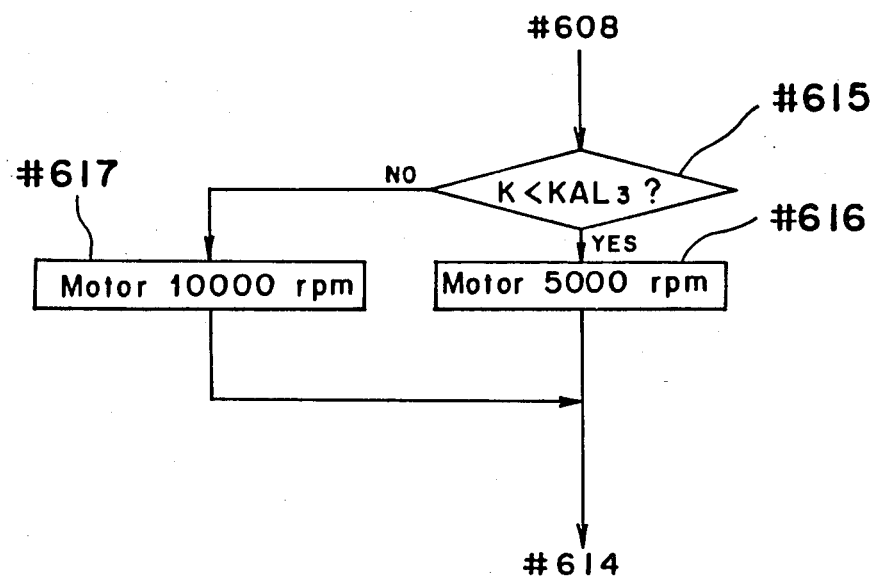

At the steps 132 to 134, if it is judged that the object is in a low contrast condition, or if it is judged that the distance can not be measured because the reliability of the measured distance is low, the program flow goes to a low contrast process routine shown in FIGS. 6A to 6C.

In FIGS. 6A to 6C, first of all, at the step 602, it is judged whether the photograph lens is positioned at the extreme position of the infinity photographing position or the nearest photographing position to the object, and the judgment is referred to hereinafter as the extreme position detection. The extreme position detection is judged by detecting whether or not the encoder pulse outputted in accordance with the movement of the photograph lens is outputted within a predetermined constant time. If the photograph lens is not positioned at the extreme position, the program flow goes to the step 603, it is judged whether or not the low contrast search inhibit flag LSIF is "1". If the low contrast search is inhibited, or the flag LSIF is "1", the program flow goes to the aforementioned distance measurement routine CDINT starting from the step 620, on the other hand, if the low contrast search is permitted, or the flag LSIF is not "1", the program flow goes to the low contrast process routine LCONS starting from the step 604.

In the low contrast process routine LCONS, the program flow goes from the step 604 to the step 605, "1" is set in a low contrast searching flag LSDF, and then, the maximum value MAX is set in the encoder pulse count number N, wherein the maximum value MAX is a maximum value which can be set in the encoder pulse counter, such as FFFF in hexadecimal.

At the next step 607, the display is turned off, and then, it is judged whether or not the auxiliary light mode flag ALMF is "1" at the step 608. If the auxiliary light mode flag ALMF is "1", the program flow goes to the step 609. At the steps 609 to 613, switching of the rotation speed of the motor MO1 and switching of the cycle of the distance measurement during the auxiliary light mode are performed by judging the conversion factor K for converting the defocus value DF to the rotation quantity of the motor MO1, and the switching control will be described below in details referring to FIGS. 9A to 9C.

Figure 9A:
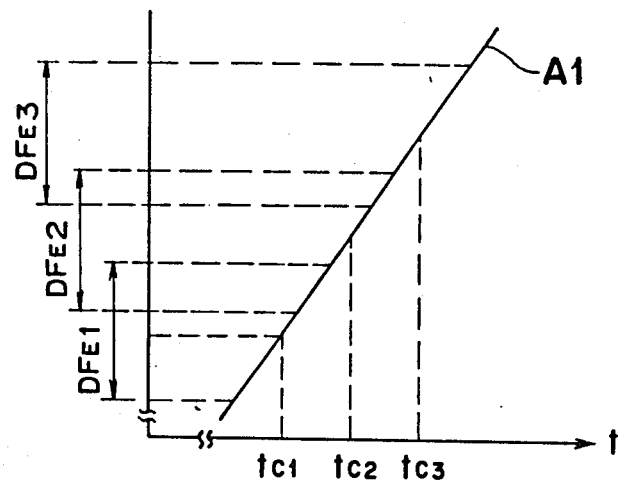
Figure 9B:
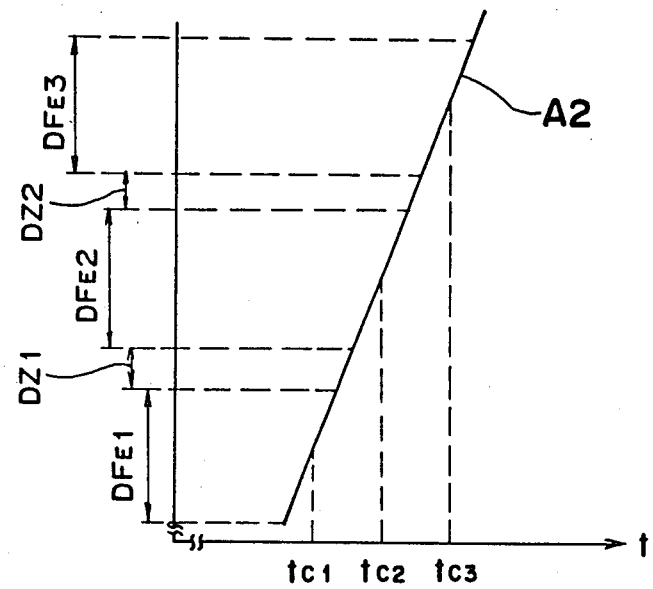
Figure 9C:
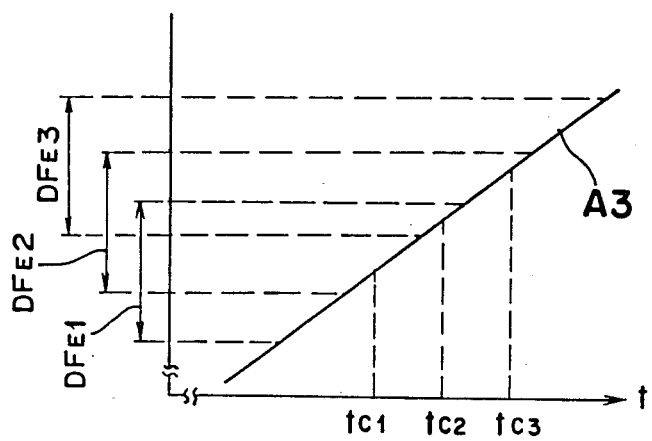

FIG. 9A shows a characteristic of the movement of a position of the photograph lens to time t with respect to the defocus cover range when the low contrast search is performed properly. The distance measurement is performed at time tc1, tc2 and tc3. The change of the position of the photograph lens can be determined by the aforementioned conversion factor K on the condition of a constant rotation speed of the motor MO1, and the position linearly varies for time t as shown in a direct line A1 of FIG. A1. In FIGS. 9A to 9C, the distance can be measured in the range DFE1 at the time tc1, the distance can be measured in the range DFE2 at the time tc2, and the distance can be measured in the range DFE3 at the time tc3, wherein the ranges DFE1, DFE2, and DFE3 are the defocus cover range of the defocus value DF determined by the equation (3). It is apparent from FIG. 9A, since the ranges DFE1 and DFE2 and the ranges DFE2 and DFE3 are respectively overlapped, the distance can be properly measured by one of the ranges, even though the object is at any corresponding position.

FIG. 9B shows a characteristic of the movement of a position of the photograph lens for time t when the conversion factor K is smaller than K of the case of FIG. 9A. As shown in a direct line A2 of FIG. 9B, the slope factor of the direct line A2 is larger than the slop factor of the direct line A1 of FIG. 9A, resulting in that the moving distance of the photograph lens per a unit time is longer than the moving distance in the case of FIG. 9A. Therefore, the ranges DFE1, DFE2, and DFE3 at the time tc1, tc2 and tc3 do not respectively continue, and there are two ranges DZ1 and DZ2 where the distance can not be measured. In the preferred embodiment, when the conversion factor K is small, the speed of the motor MO1 is reduced, and the ranges DZ1 and DZ2 can be prevented from occurring where the distance can not be measured.

FIG. 9C shows a characteristic of the movement of a position of the photograph lens for time t when the conversion factor K is larger than K of the case of FIG. 9A. As shown in a direct line A3 of FIG. 9C, the slope factor of the direct line A3 is smaller than the slope factor of the direct line A1 of FIG. 9A, resulting in that the moving distance of the photograph lens per a unit time is shorter than the moving distance in the case of FIG. 9A. Therefore, the ranges DFE1, DFE2 and DFE3 at the time tc1, tc2 and tc3 are overlapped each other so that the overlapped portions are longer than the overlapped portions in FIG. 9A. That is, the range DFE2 is not required, and the distance between the camera and the object can be measured even though the distance measurement at the time tc2 is omitted. In the preferred embodiment, when the conversion factor K is larger than a predetermined value, after the photograph lens is moved by a constant distance, the next distance measurement starts, resulting in that the lighting times of the auxiliary light can be reduced without the range of the measured distance where the distance can not be measured, the power consumption of the auxiliary light can be reduced, and the dazzling times to men as the object can be reduced.

Referring back to the flow chart of FIG. 6A, the aforementioned low contrast search during the auxiliary light mode will be described below.

At the step 609, it is judged whether or not the conversion factor K is larger than a predetermined threshold value KAL1. If the conversion factor K is equal to or larger than KAL1, the program flow goes to the step 610, the rotation speed of the motor MO1 is set at a speed of 10,000 rpm, and then, the conversion factor K is compared with a predetermined threshold value KAL2 at the step 611, wherein the value KAL2 is arranged so that KAL2>KAL1. If the conversion factor K is smaller than KAL2, i.e., KAL1≦K<KAL2, and this case correspond to FIG. 9A. Then, the program flow goes to the step 614, the control of the motor MO1 starts, and the program flow goes to the distance measurement routine CDINT at the step 620. On the other hand, the conversion factor K is equal to or larger than KAL2 at the step 611, and this case corresponds to FIG. 9C. In this case, an unnecessary distance measurement may be performed, as described above. Therefore, after the control of the motor MO1 starts at the step 612, at the step 613, the photograph lens is moved until the encoder pulse count number N arranged at the step 606 becomes the value (MAX-NS) from the maximum value MAX, that is, the photograph lens is moved by NS pulses, and then, the program flow goes to the step 614.

On the other hand, if the conversion factor K is smaller than KAL1 at the step 609, this case corresponds to FIG. 9B, the ranges which can not be measured may occur as described above. Therefore, the rotation speed of the motor MO1 is reduced into 5,000 rpm at the step 640, and then, the program flow goes to the step 614.

If it is judged at the step 608 that the auxiliary light mode is not arranged, the conversion factor K is compared with a predetermined threshold value KAL3 at the step 615 shown in FIG. 6C. If K<KAL3, the motor MO1 is set at a rotation speed of 5,000 rpm at the step 616, on the other hand, if K≧KAL3, the motor MO1 is set at a rotation speed of 10,000 rpm at the step 617, and then, the program flow goes from the steps 616 and 617 to the step 614.

The predetermined threshold value KAL3 is arranged so that KAL3<KAL1. Because the period time of the auxiliary light mode is longer than the cycle of the distance measurement with ambient light, and the conversion factor K is generally large during the distance measurement with ambient light, resulting in that there is not a problem that the power consumption is raised during the distance measurement with the auxiliary light, and men of the object is dazzled by the auxiliary light. Therefore, when K≧KAL3, the motor MO1 rotates at a high speed of 10,000 rpm, and the distance measurement is repeatedly performed.

As described above, when the defocus value DF of the photograph lens for the distance between the object and the camera is too large and the defocus value DF is not within the defocus cover range, the distance measurement moving the photograph lens is repeatedly performed. The distance measurement is performed correctly and efficiently by switching the rotation speed of the motor MO1 depend upon the conversion factor K. That is, during the auxiliary light mode, even though the conversion factor K is small, the range where the distance can not be measured is not caused by driving the motor MO1 at a lower rotation speed. On the other hand, when the conversion factor K is large, the lighting times of the auxiliary light can be reduced to a minimum times, resulting in that the power consumption can be reduced and feeling for using the camera can be improved.

Next, the case will be described below when it is detected at the step 602 that the photograph lens is positioned at the extreme position.

The program flow goes from the step 602 to the step 618 shown in FIG. 6B, the motor MO1 is stopped, and then, it is judged whether or not the low contrast search inhibit flag LSIF is "1" at the step 619. If the flag LSIF is "1", or the low contrast search is inhibited, the program flow goes to the distance measurement routine CDINT of the next cycle at the step 620, on the other hand, if the flag LSIF is "0", or the low contrast search is permitted, it is judged whether or not the low contrast searching flag LSDF is "1" at the step 621. If the flag LSDF is "0", or the low contrast search starts from the extreme position of the photograph lens, "0" is set in a flag LSF designating the first extreme position detection during the low contrast search at the step 629, and then, the direction of rotation of the motor MO1 is inverted at the step 630, and the program flow goes to the low contrast search process routine LCONS at the step 631.

On the other hand, at the step 621, if the low contrast searching flag LSDF is "1" or the low contrast search process is being performed, with the photograph lens being positioned at the extreme position during the low contrast search, it is judged whether or not the aforementioned flag LSF is "1" at the step 622, if the flag LSF is "1" or this is the first extreme position detection, the program flow goes to the step 629, and then, the low contrast search is continued. On the other hand, if the flag LSF is "0", or this is the second extreme position detection, "1" is set in the low contrast inhibit flag LSIF at the step 623, and then, "0" is set in the low contrast searching flag LSDF at the step 624. Next, the display of the low contrast condition is turned on in the step 625 and then, the program flow goes to the step 626, where it is judged whether or not the one shot AF flag OAFF is "1", wherein the one shot AF flag OAFF is provided for locking the photograph lens at the position and inhibiting the automatic focus operation once it is judged that the image is in an in-focus position. If the one shot AF flag OAFF is "1", or the one shot AF mode is arranged, the microcomputer MCOM waits for the interrupt signal again inputted into the interrupt terminal INT1 or INT2 in the step 627. On the other hand, the one shot AF flag OAFF is "0", or the one shot AF mode is not arranged, the program flow goes to the distance measurement routine CDINT at the step 628.

In the preferred embodiment, at the above steps 618 to 622, if the extreme position of the photograph lens is detected twice during the low contrast search, lighting of the auxiliary light is inhibited when the low contrast search is inhibited. This process is performed for the following reason. That is, even though the distance measurement is performed with the auxiliary light after the end of the low contrast search, the possibility of detecting the focus condition is low, the power consumption is increased and also a larger unpleasant feeling is given as men of the object. That is, if the distance can not be measured during the low contrast search, even though the extreme position detection is performed twice, the next low contrast search is inhibited and lighting of the auxiliary light is inhibited, resulting in that no meaning lighting of the auxiliary light can not be performed, and also the power consumption is reduced, feeling of using the camera can be improved.

Figure 7:
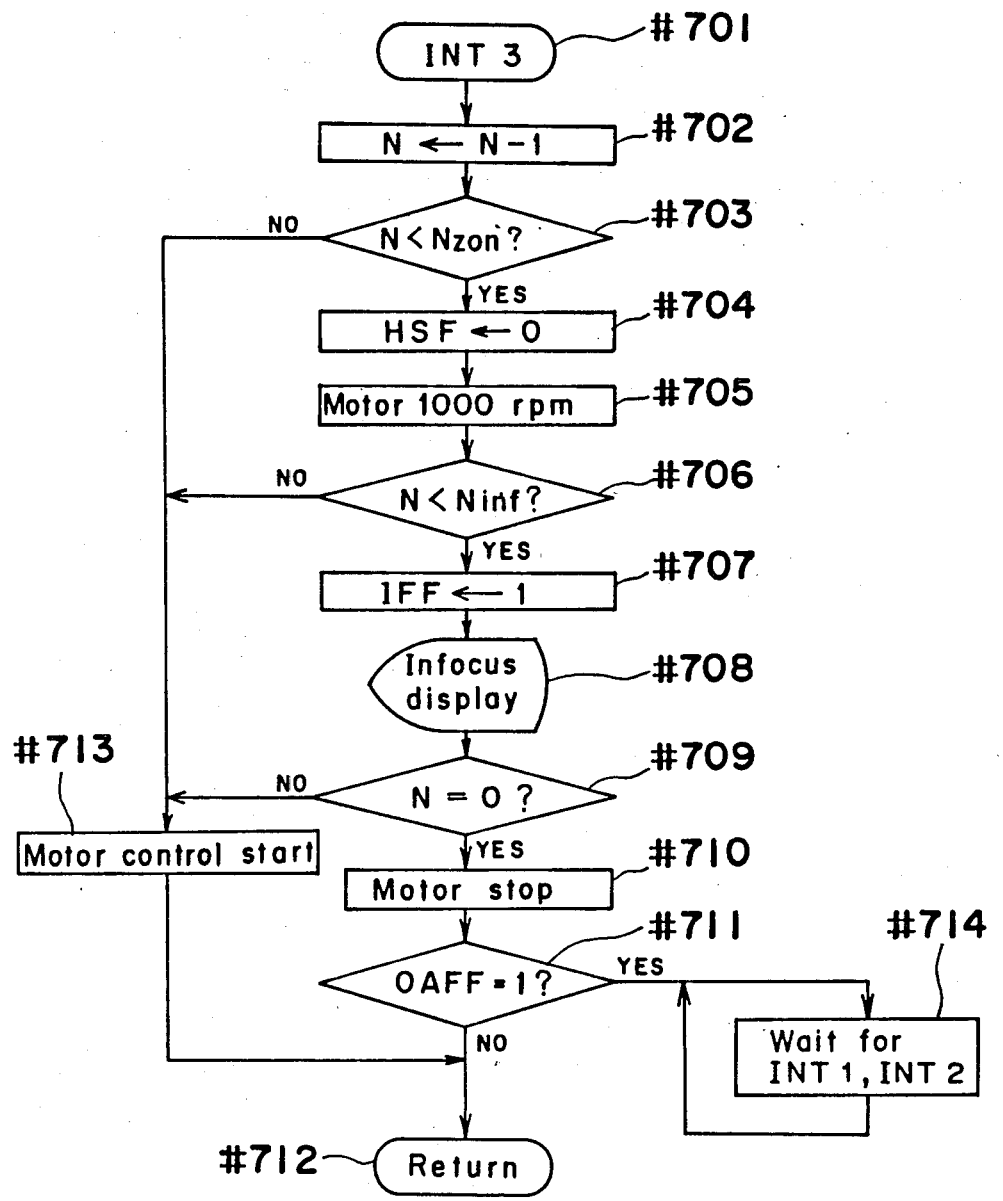
FIG. 7 is a flow chart showing a control operation of the control circuit shown in FIGS. 2A and 2B when an INT3 interruption occurs.

Next, when the rotation quantity of the motor MO1 is detected by the encoder pulse generator ENC and a predetermined pulse signal AFP is inputted into the interrupt terminal INT3 of the microcomputer MCOM, the interrupt routine INT3 is performed shown in FIG. 7.

First of all, at the step 702, 1 is subtracted from the encoder pulse count number N and the subtracted value (N−1) is newly set in the encoder pulse count number N, and then, it is judged whether or not the the encoder pulse count number N is smaller than a predetermined threshold value Nzon at the step 703. If the encoder pulse count number N is equal to or larger than Nzon, this is the case when the motor MO1 is driven at a high speed, the control of the motor MO1 starts at the step 713, and then, the program flow returns back to the main routine at the step 712. On the other hand, if the encoder pulse count number N is smaller than Nzon, the program flow goes to the step 704, "0" is set in the high speed flag HSF, and then, the motor MO1 is set at a rotation speed of 1,000 rpm. As a result, the speed of the motor MO1 can be properly controlled, and the photograph lens can be prevented from overrunning the in-focus position. Moreover, it is judged whether or not the encoder pulse count number N is smaller than Ninf, if N≧Ninf at the step 706, it is judged that the photograph lens is not positioned within the in-focus range, and then, the program flow goes to the step 713 to continue the driving of the motor MO1.

On the other hand, if the encoder pulse count number N is smaller than the predetermined threshold value Ninf, it is judged that the photograph lens is positioned within the in-focus range, "1" is set in the in-focus flag IFF at the step 707, and then, the display of the in-focus condition is turned on at the step 708. When "1" is set in the in-focus flag IFF, the release operation is permitted during the AF priority mode, and the release operation is inhibited when the in-focus flag IFF is reset.

The program flow goes from the step 708 to the step 709, it is judged whether or not the encoder pulse count number N is "0", if N is not "0", the program flow goes to the step 713, the motor MO1 is driven at a rotation speed of 1,000 rpm. On the other hand, if the encoder pulse count number N is "0", the motor MO1 is stopped at the step 710, and then, it is judged whether or not the one shot AF flag OAFF is "1" at the step 711. If the one shot AF mode is set, or the flag OAFF is "1", the microcomputer MCOM waits for the interrupt signal inputted into the interrupt terminal INT or INT2 at the step 714, without performing the next distance measurement. On the other hand, if the one shot AF mode is not arranged, or the flag OAFF is "0", the program flow returns to the main routine at the step 712.

As described above, in the first preferred embodiment, the auxiliary light mode is continuously arranged after the auxiliary light mode flag ALMF is arranged at the step 143 until the flag ALMF is reset at the step 208. That is, during the one shot AF mode, after the program flow enters the auxiliary light mode at the step 143, the distance measurement with the auxiliary light is performed until it is judged that the photograph lens is in the in-focus range, except when the flag ALMF is canceled at the step 208.

During the continuous AF mode, the distance can be correctly measured at a quick response when the auxiliary light mode is arranged. The cancellation of the auxiliary light mode is judged by the AGC data and the contrast value at the preliminary integration, resulting in that the judgment of the auxiliary light mode can be efficiently performed without a long cycle of the distance measurement.

Moreover, in the low contrast search, the speed of the motor MO1 and the period of lighting of the auxiliary light are changed by the conversion factor K, resulting in that the distance can be correctly measured at a low power consumption. Lighting of the auxiliary light is inhibited during the low contrast search inhibition time, resulting in that the auxiliary light can be prevented from lighting unnecessarily, and unpleasant feeling for the photographer of the object can be reduced.

Figure 5:
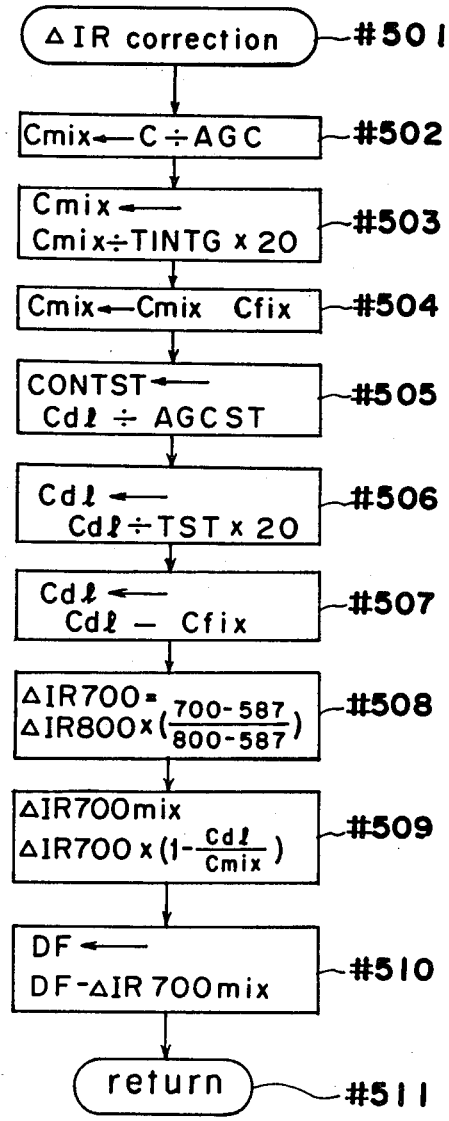

FIG. 5 shows another example of performing the $\Delta IR$ correction. A contrast Cmix converted by the integration time 20 msec of the image sensor and AGC×1 under the auxiliary light emission is calculated in the steps 502 and 503. The result of the calculation is subtracted by a contrast Cfix which is obtained by a fixed pattern of the image sensor. The contrast Cfix due to the fixed pattern of the image sensor is produced by dispersion of the each pixell of the image sensor and the output thereof representing the dark current and not by the contrast of the object. Thus, an accurate contrast data can be obtained by the subtraction of Cmix−Cfix. The value Cfix may be a standard value which is obtained by the image sensor used. The contrast CONTST for the ambient light with respect to the integration time 20 msec. and AGC×1 may be obtained in the steps 505 and 506 and the result is subtracted by Cfix in the step 507. The color aberration $\Delta IR_{700}$ on the axis for the light of wave length 700 nm is calculated in the step 508, then the color aberration on the axis for the mixed light is obtained using the contrast Cmix under the auxiliary light and the contrast Cd1 under the ambient light in the step 509. Subsequently, the true defocus value can be obtained in the step 510 by subtracting the $\Delta IRmix_{700}$ from the detected defocus value. By the calculation mentioned above, it is possible to improve the accuracy of the defocus value decreasing the effect of the contrast of the fixed pattern of the image sensor.

Figure 17:
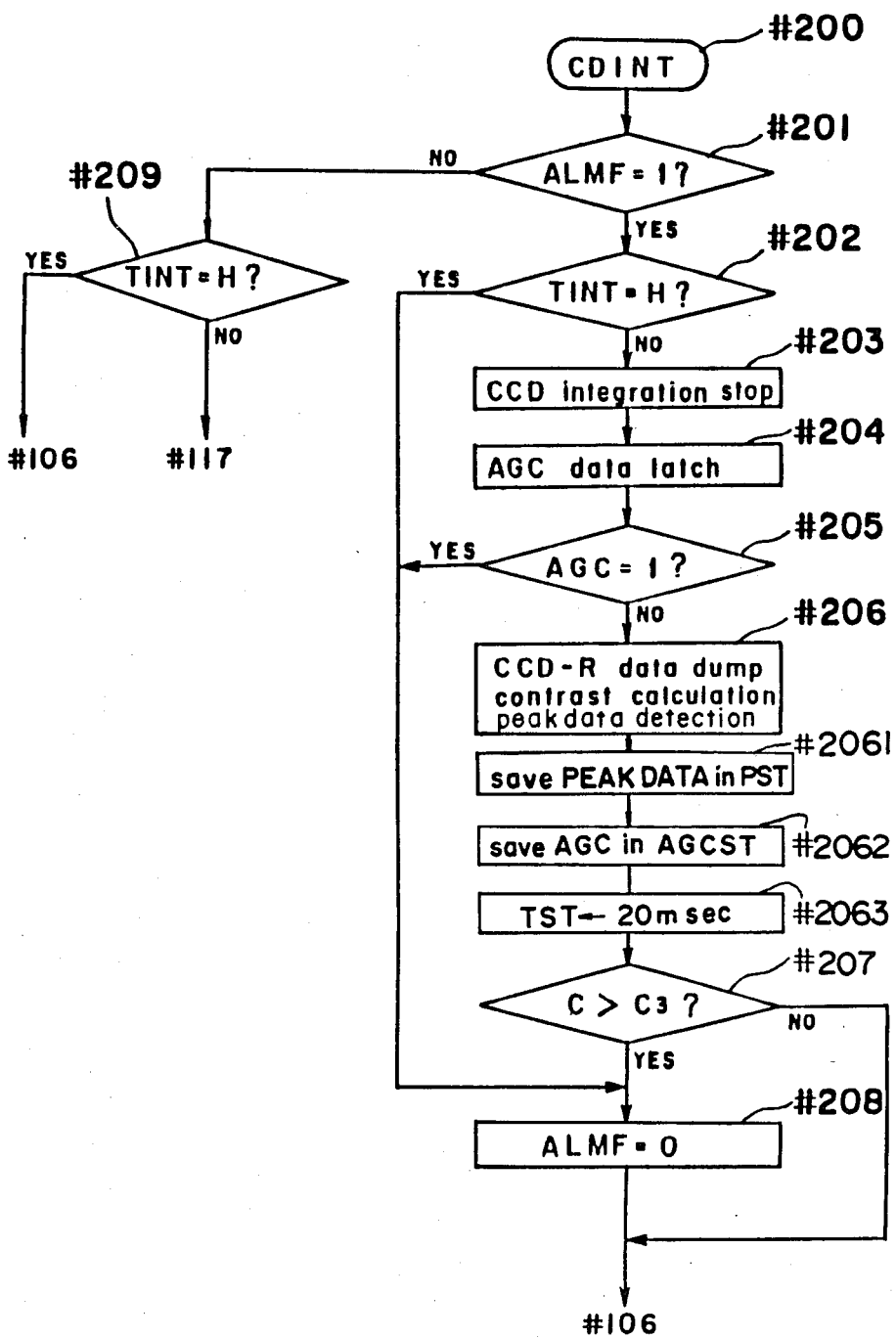
FIGS. 17 to 19 are flow charts showing an operation of another embodiment of the present invention.
Figure 18:
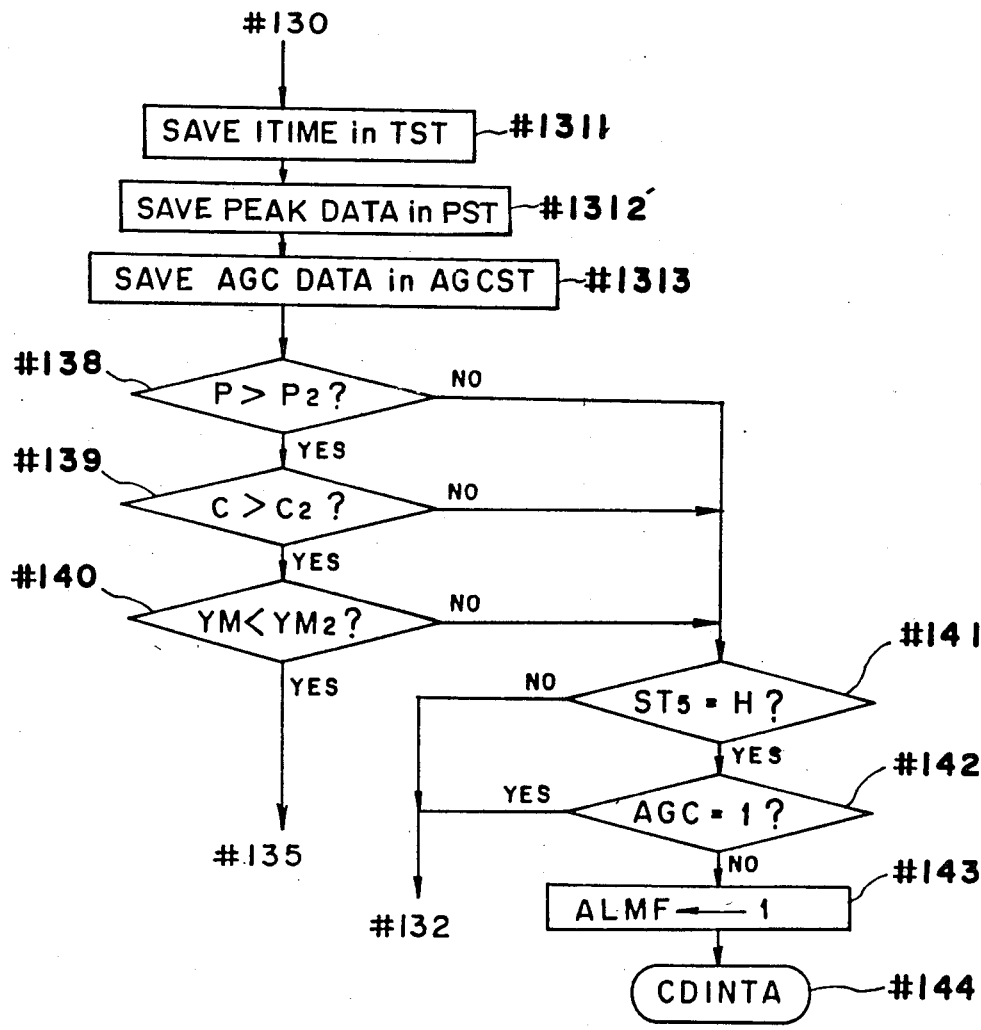
Figure 19:
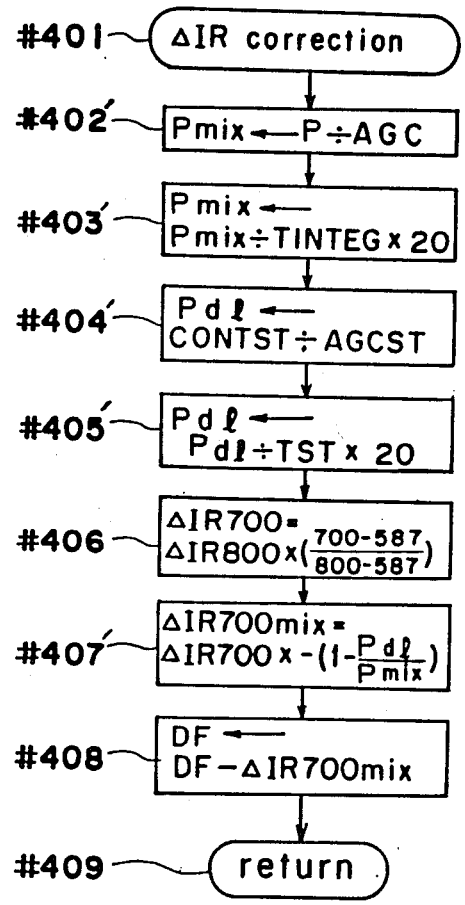

Moreover, in place of the contrast, the output of the image sensor such as the peak data of the output of the image sensor may be used in the process as shown in FIGS. 17 to 19. In this case, the contrast Cmix may be replaced by the peak data Pmix as shown in the steps 402', 403', 404' 405' and 407' in FIG. 19 and the peak data is saved in the RAM as PST as shown in the steps 2061' in FIG. 17, 1313' in FIG. 18.

In the embodiment, the auxiliary light device AL is enclosed in the electric flash device FS, however, the present invention is not limited to this, the auxiliary light device AL may be arranged outside of the main body BD of the camera. Moreover, the auxiliary light device AL may be arranged in the main body BD of the camera behind the photograph lens, as described in the Japanese patent laid open No. 208512/1984, and in this case, the light beam of the auxiliary light passes through the photograph lens and reaches the object.

In case the release button (not shown) of the camera is fully depressed, a release switch S2 is turned on, so that an exposure operation starts according to the result of the exposure calculation, AF control mode and focus condition of the lens. However, such operation is not directly related to the present invention and the details is herein omitted.

TABLE 1

| AFMTB | AFMTR | AFMTF | Control of Motor MO1 |
|---|---|---|---|
| 1 | 0 | 0 | Brake |
| 0 | 1 | 0 | Clockwise rotation |
| 0 | 0 | 1 | Counterclockwise rotation |
| 0 | 0 | 0 | Stop |

TABLE 2

| MM | MN | Control of Motor MO2 |
|---|---|---|
| 0 | 1 | Brake |
| 1 | 0 | Clockwise rotation |
| 0 | 0 | Counterclockwise rotation |
| 1 | 1 | Stop |

TABLE 3

| Condition | Mode | Operation | Terminal |
|---|---|---|---|
| S3 OFF | One shot | Only one exposure during switch S2 on | P60←H |
| S3 ON | Continuous shot | Continuous exposure during switch S2 on | P60←L |
| S4 OFF | AF priority | Inhibit exposure until in-focus attainment even though switch S2 on | P61←H |
| S4 ON | Release priority | Exposure start independent of focus condition if switch S2 on | P61←L |
| S5 OFF | One shot AF | Inhibit automatic focus operation locking lens in case switch S2 is on and in-focus is attained after automatic focus operation start | P62←H |
| S5 ON | Continuous AF | Always automatic focus operation during S2 on | P62←L |

TABLE 4

| Flag | Initial value | Condition | Content |
|---|---|---|---|
| Auxiliary light mode flag | 0 | 1 | Distance measurement with auxiliary light |
|  |  | 0 | Distance measurement with ambient light |
| Low contrast search inhibit flag | 0 | 1 | Inhibit low contrast search |
|  |  | 0 | Permit low contrast search |

TABLE 4-continued

| Flag | Initial value | Condition | Content |
|---|---|---|---|
| High speed flag | 0 | 1 | Motor MO1 rotation at high speed |
|  |  | 0 | Motor MO1 rotation at low speed or stop |
| In-focus flag | 0 | 1 | In-focus position of lens |
|  |  | 0 | Out-of-focus position of lens |
| Low contrast searching flag | 0 | 1 | In low contrast search |
|  |  | 0 | Not in low contrast search |
| LS flag | 1 | 1 | First time of extreme position detection |
|  |  | 0 | Second time of extreme position detection |

What is claimed is:

1. An automatic focus control device for use in a camera, comprising:
   a photographic lens;
   light receiving means including a plurality of photocells which receives light passing through said photographic lens from an object to be focus detected;
   focus condition detecting means for detecting a focus condition of said photographic lens based on the output of said light receiving means and calculating the amount of defocus of said photographic lens;
   auxiliary light emitting means for emitting auxiliary light to said object;
   storing means for storing the output of said light receiving means under the auxiliary light emission and ambient light;
   comparing means for comparing the stored output of said storing means and the output of said light receiving means under the ambient light; and
   means for correcting the detected defocus amount under the auxiliary light emission in accordance with the result of comparison.

2. An automatic focus control device according to claim 1, wherein said storing means stores peak data of the output of said light receiving means and said comparing means compares the stored peak data and the peak data of output of said light receiving means under ambient light.

3. An automatic focus control device according to claim 1, wherein said correcting means calculates $$\Delta IR\ \lambda mix = \Delta IR\ \lambda X\ (1 - Pd\ 1/Pmix)$$

wherein $\Delta IR\ \lambda$ is the color aberration on the lens axis for the auxiliary light with the wave length $\lambda$, Pd 1 is a peak data under the auxiliary light.

4. An automatic focus control device according to claim 3, wherein said correcting means comprises calculation means for calculating a correction value $\Delta IR\ \lambda$ by the color aberration on the axis of a photographic lens under a specific wave length, and the values of the specific wave length, wave length of the auxiliary light and wave length of the standard wave length.

5. An automatic focus control device according to claim 4, wherein the value of $\Delta IR\ \lambda$ is stored in the interchangeable lens and is transferred to the camera body.

6. An automatic focus control device for use in a camera, comprising:
   a photographic lens;

light receiving means including a plurality of photocells which receives light passing through said photographic lens from an object to be focus detected;

contrast detecting means for detecting the contrast of the object based on the output of said light receiving means;

focus condition detecting means for detecting a focus condition of said photographic lens based on the output of said light receiving means and calculating the amount of defocus of said photographic lens;

auxiliary light emitting means for emitting auxiliary light to said object;

storing means for storing the output of said contrast detecting means under the auxiliary light emission and ambient light;

comparing means for comparing stored output of said storing means and the output of said contrast detecting means under the ambient light; and means for correcting the detected defocus amount under the auxiliary light emission in accordance with the result of comparison.

7. An automatic focus control device according to claim 6, wherein said correcting means calculates $$\Delta IR\ \lambda mix = \Delta IR\ \lambda x(1 - Cdl/Cmix)$$

wherein $\Delta IR\ \lambda$ is the color aberration on the lens axis for the auxiliary light with the wave length $\lambda$, Cd l is a contrast under the absence of the auxiliary light, Cmix is the contrast under the auxiliary light.

8. An automatic focus control device according to claim 7, wherein the values Cmix and Cd l are respectively subtracted by a contrast occurring by the dispersion of the property of the light receiving element.

9. An automatic focus control device according to claim 7, wherein said correcting means comprises calculation means for calculating a correction value $\Delta IR\ \lambda$ by the color aberration on the axis of a photographic lens under a specific wave length, and the values of the specific wave length, wave length of the auxiliary light and wave length of the standard wave length.

10. An automatic focus control device according to claim 9, wherein said calculating means calculates the value $\Delta IR\ \lambda$ by the equation $$\Delta IR\ \lambda = \Delta IR\ \lambda fix \times (\lambda - \lambda d)/(\lambda fix - \lambda d)$$

wherein $\lambda$ is the wave length of the auxiliary light, $\lambda$ d is wave length of the standard light, $\lambda$ fix is the specific wave length of the standard light, $\lambda$ fix is the specific wave length and $\Delta IR\ \lambda$ fix is the color aberration on the axis under the specific wave length.

11. An automatic focus control device according to claim 10, wherein the $\Delta I\ \lambda$ fix is stored in the interchangeable lens and is transferred to the camera body.

* * * * *